(12) United States Patent
Abedini et al.

(10) Patent No.: US 11,743,802 B2
(45) Date of Patent: Aug. 29, 2023

(54) TIMING MANAGEMENT FOR WIRELESS REMOTE UNITS

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/468,060

(22) Filed: Sep. 7, 2021

(65) Prior Publication Data

US 2022/0110044 A1 Apr. 7, 2022

Related U.S. Application Data

(60) Provisional application No. 63/198,266, filed on Oct. 7, 2020.

(51) Int. Cl.
*H04W 40/12* (2009.01)
*H04W 56/00* (2009.01)
*H04W 40/24* (2009.01)

(52) U.S. Cl.
CPC ......... *H04W 40/12* (2013.01); *H04W 40/246* (2013.01); *H04W 40/248* (2013.01); *H04W 56/0045* (2013.01)

(58) Field of Classification Search
None
See application file for complete search history.

(56) References Cited

U.S. PATENT DOCUMENTS

| | | | | |
|---|---|---|---|---|
| 10,701,727 | B2 * | 6/2020 | Hampel | H04W 72/53 |
| 11,140,695 | B1 * | 10/2021 | Eyuboglu | H04W 72/535 |
| 11,271,699 | B1 * | 3/2022 | Eyuboglu | H04B 7/0691 |
| 2019/0110268 | A1 * | 4/2019 | Abedini | H04L 45/64 |

* cited by examiner

*Primary Examiner* — Brian S Roberts
(74) *Attorney, Agent, or Firm* — Sevan Savsa; Harrity & Harrity, LLP

(57) ABSTRACT

Various aspects of the present disclosure generally relate to wireless communication. In some aspects, a wireless forwarding node may determine a timing reference configuration that indicates an alignment for one or more symbol boundaries associated with forwarding communications between an upstream wireless node and a downstream wireless node. The wireless forwarding node may forward the communications between the upstream wireless node and the downstream wireless node based at least in part on the timing reference configuration. Numerous other aspects are provided.

30 Claims, 15 Drawing Sheets

US 11,743,802 B2

TIMING MANAGEMENT FOR WIRELESS REMOTE UNITS

CROSS-REFERENCE TO RELATED APPLICATION

This patent application claims priority to U.S. Provisional Patent Application No. 63/198,266, filed on Oct. 7, 2020, entitled "TIMING MANAGEMENT FOR WIRELESS REMOTE UNITS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for timing management for wireless remote units.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless forwarding node includes determining a timing reference configuration that indicates an alignment for one or more symbol boundaries associated with forwarding communications between an upstream wireless node and a downstream wireless node; and forwarding the communications between the upstream wireless node and the downstream wireless node based at least in part on the timing reference configuration.

In some aspects, a method of wireless communication performed by a control node includes determining a timing reference configuration that indicates an alignment for one or more symbol boundaries associated with forwarding communications between an upstream wireless node and a downstream wireless node; and transmitting information indicating the timing reference configuration to a wireless forwarding node configured to forward the communications between the upstream wireless node and the downstream wireless node based at least in part on the timing reference configuration.

In some aspects, a wireless forwarding node for wireless communication includes a memory; and one or more processors, coupled to the memory, configured to: determine a timing reference configuration that indicates an alignment for one or more symbol boundaries associated with forwarding communications between an upstream wireless node and a downstream wireless node; and forward the communications between the upstream wireless node and the downstream wireless node based at least in part on the timing reference configuration.

In some aspects, a control node for wireless communication includes a memory; and one or more processors, coupled to the memory, configured to: determine a timing reference configuration that indicates an alignment for one or more symbol boundaries associated with forwarding communications between an upstream wireless node and a downstream wireless node; and transmit information indicating the timing reference configuration to a wireless forwarding node configured to forward the communications between the upstream wireless node and the downstream wireless node based at least in part on the timing reference configuration.

In some aspects, a non-transitory computer-readable medium stores one or more instructions for wireless communication that, when executed by one or more processors of a wireless forwarding node, cause the wireless forwarding node to: determine a timing reference configuration that indicates an alignment for one or more symbol boundaries associated with forwarding communications between an upstream wireless node and a downstream wireless node; and forward the communications between the upstream wireless node and the downstream wireless node based at least in part on the timing reference configuration.

In some aspects, a non-transitory computer-readable medium stores one or more instructions for wireless communication that, when executed by one or more processors of a control node, cause the control node to: determine a timing reference configuration that indicates an alignment for one or more symbol boundaries associated with forwarding communications between an upstream wireless node and a downstream wireless node; and transmit information indicating the timing reference configuration to a wireless forwarding node configured to forward the communications between the upstream wireless node and the downstream wireless node based at least in part on the timing reference configuration.

In some aspects, an apparatus for wireless communication includes means for determining a timing reference configuration that indicates an alignment for one or more symbol boundaries associated with forwarding communications between an upstream wireless node and a downstream wireless node; and means for forwarding the communications between the upstream wireless node and the downstream wireless node based at least in part on the timing reference configuration.

In some aspects, an apparatus for wireless communication includes means for determining a timing reference configuration that indicates an alignment for one or more symbol boundaries associated with forwarding communications between an upstream wireless node and a downstream wireless node; and means for transmitting information indicating the timing reference configuration to a wireless forwarding node configured to forward the communications between the upstream wireless node and the downstream wireless node based at least in part on the timing reference configuration.

Aspects generally include a method, apparatus, system, computer program product, non-transitory computer-readable medium, user equipment, base station, distributed unit, mobile termination unit, forwarding node, repeater node, relay node, control node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
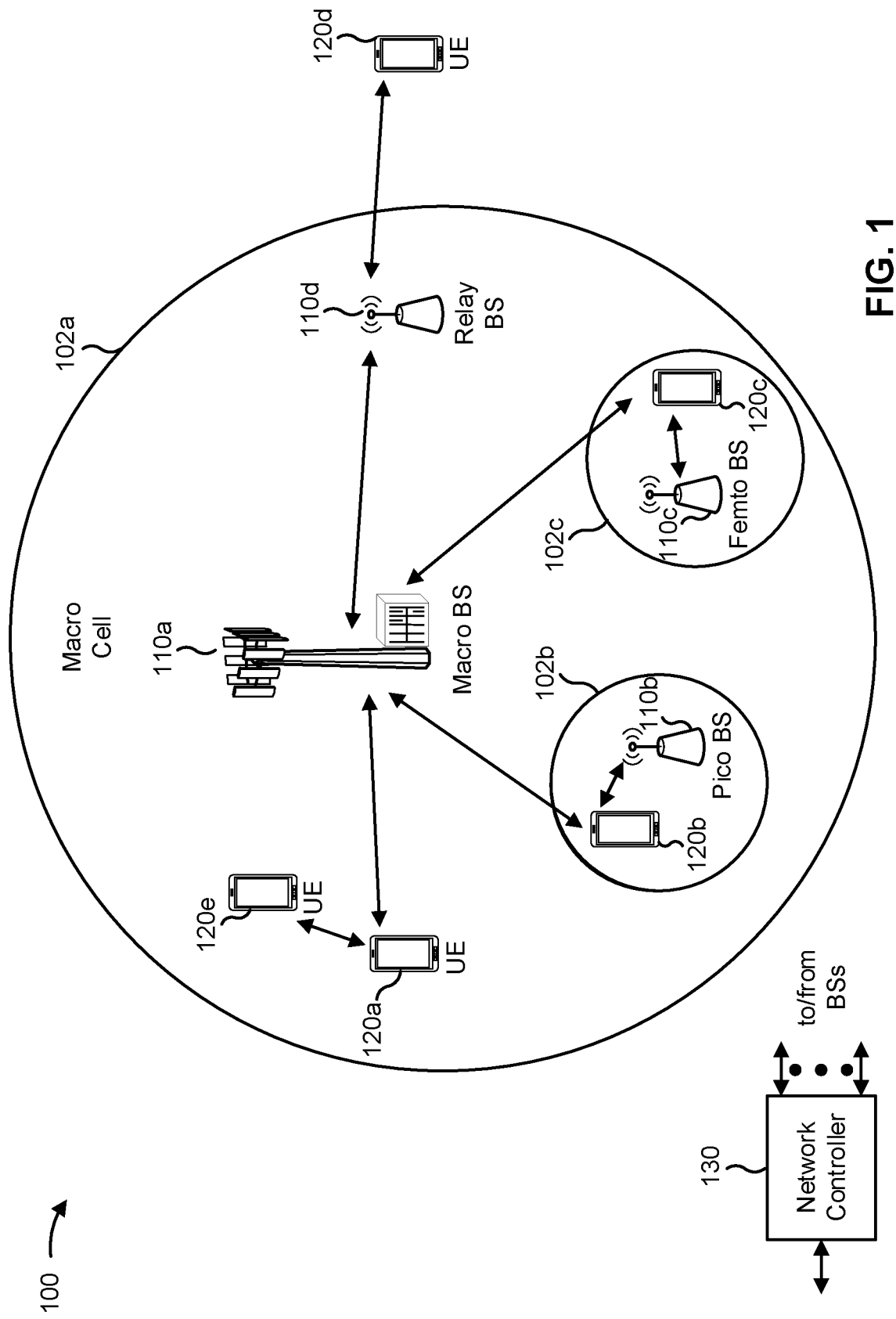
FIG. 1 is a diagram illustrating an example of a wireless network, in accordance with the present disclosure.

In some communication systems, such as 5G or NR, a multi-hop network such as an integrated access and backhaul (IAB) network may be deployed to enable communication between wireless nodes of the network. In general, the wireless nodes that are deployed in the multi-hop network may be associated with a timing scheme or timing configuration that enables alignment of communications between wireless nodes associated with different links. For example, one or more timing references may be used to identify a set of communication opportunities, such as a set of symbols or a set of slots that are allocated for a set of channels. For example, in an IAB network, the timing references may include a downlink transmit timing that an upstream node (e.g., a distributed unit (DU) of an IAB donor and/or a DU of an IAB node) uses to transmit one or more downlink signals to a downstream node (e.g., a UE and/or a mobile termination (MT) unit of a child IAB node). Furthermore, the timing references may include a downlink receive timing that the downstream node uses to receive the downlink signals from the upstream node, an uplink transmit timing that the downstream node uses to transmit uplink signals to the upstream node, and/or an uplink receive timing that the upstream node uses to receive the uplink signals from the downstream node. The downlink transmit timing may generally be aligned across all upstream nodes, and a threshold time misalignment may be tolerated for the uplink transmit timing to account for different propagation delays and/or round-trip times between upstream and downstream nodes.

Some aspects described herein enable a timing framework to manage various timing references for a wireless forwarding node deployed in a multi-hop network (e.g., to extend coverage of a base station and/or enable communication between two nodes that may otherwise be outside of wireless communication range). For example, in some aspects, the wireless forwarding node may include an MT unit to communicate with an upstream wireless node over a fronthaul link, and a remote unit (RU) (e.g., a repeater unit or a relay unit) to communicate with a downstream wireless node over an access link or a service link. Accordingly, some aspects described herein relate to techniques to configure a set of timing references for the wireless forwarding node, which may include a downlink receive timing and an uplink transmit timing that the MT unit uses to communicate with the upstream wireless node, and a downlink transmit timing and an uplink receive timing that the RU uses to communicate with the downstream wireless node. Additionally, or alternatively, the wireless forwarding node may be implemented with a separation whereby the MT unit communicates with a control node (which may be the same or different from the upstream wireless node) over the fronthaul link to exchange control information (e.g., to configure forwarding operations), and the RU may communicate with both the upstream wireless node and the downstream wireless node to perform forwarding operations. In this case, the wireless forwarding node may be associated with up to six different timing references, which may include a downlink receive timing and an uplink transmit timing that the MT unit uses to communicate with the control node, and a downlink receive timing, an uplink transmit timing, a downlink transmit timing, and an uplink transmit timing that the RU uses to forward communications between the upstream and downstream wireless nodes. In this way, the alignment of the timing references may improve synchronization among different nodes in the multi-hop network, which may increase accuracy of positioning determinations, increase a number of hops supported in the multi-hop network, and/or reduce interference in the multi-hop network, among other examples.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
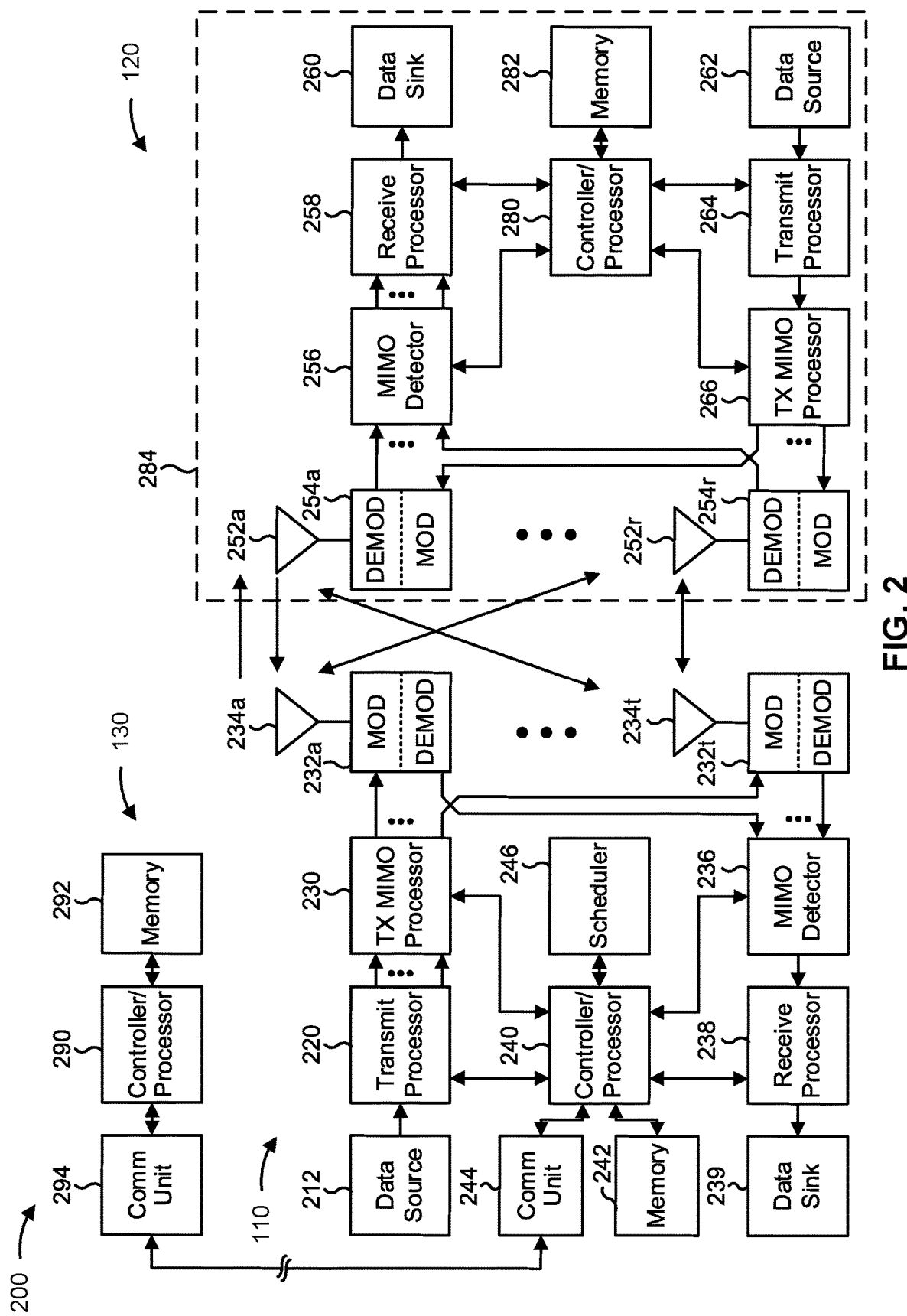
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-14).

Controller/processor 240 of base station 110, controller/processor 280 of UE 120, and/or any other component(s) of FIG. 2 may perform one or more techniques associated with timing management for wireless remote units, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, a wireless forwarding node includes means for determining a timing reference configuration that indicates an alignment for one or more symbol boundaries associated with forwarding communications between an upstream wireless node and a downstream wireless node, and/or means for forwarding the communications between the upstream wireless node and the downstream wireless node based at least in part on the timing reference configuration. The means for the wireless forwarding node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the wireless forwarding node to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the wireless forwarding node includes means for receiving, from a control node, information indicating the timing reference configuration associated with forwarding the communications between the upstream wireless node and the downstream wireless node.

In some aspects, the wireless forwarding node includes means for transmitting, to the control node, capability information indicating one or more of: a set of timing reference configurations supported by the wireless forwarding node, or a suggested timing reference configuration to be used for forwarding the communications between the upstream wireless node and the downstream wireless node.

In some aspects, a control node includes means for determining a timing reference configuration that indicates an alignment for one or more symbol boundaries associated with forwarding communications between an upstream wireless node and a downstream wireless node, and/or means for transmitting information indicating the timing reference configuration to a wireless forwarding node configured to forward the communications between the upstream wireless node and the downstream wireless node based at least in part on the timing reference configuration. The means for the control node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the control node to perform operations described herein may include, for example, controller/processor 290, memory 292, and/or communication unit 294.

In some aspects, the control node includes means for receiving, from the wireless forwarding node, capability information indicating one or more of: a set of timing reference configurations supported by the wireless forwarding node, or a suggested timing reference configuration to be used for forwarding the communications between the upstream wireless node and the downstream wireless node.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
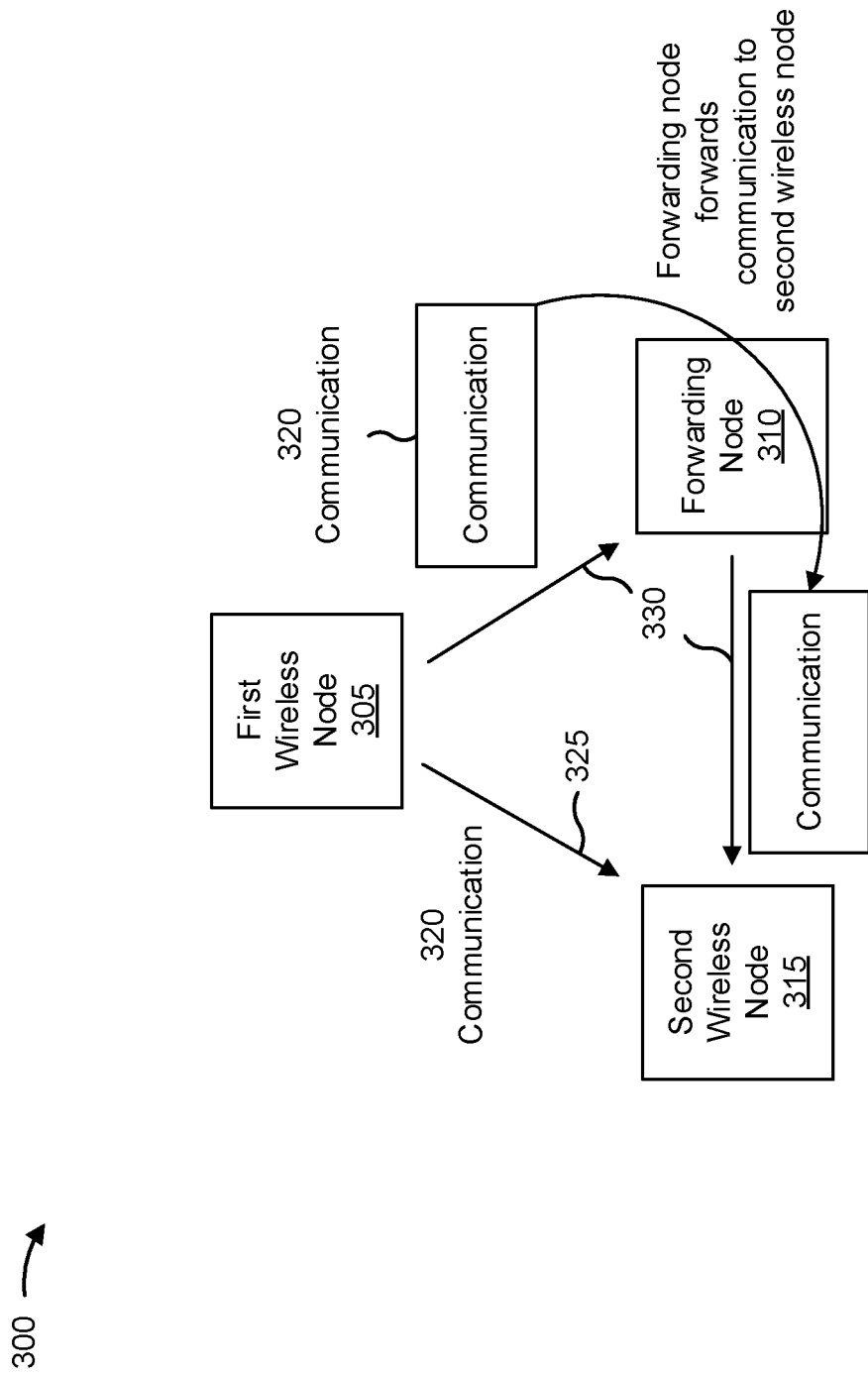
FIG. 3 is a diagram illustrating an example of a forwarding node that forwards communications between a first wireless node and a second wireless node, in accordance with the present disclosure.

FIG. 3 is a diagram illustrating an example 300 of a forwarding node (e.g., a repeater node or a relay node) that forwards communications between a first wireless node and a second wireless node, in accordance with the present disclosure. As shown, example 300 includes a first wireless node 305 (e.g., an integrated access and backhaul (IAB) node, an IAB donor, a base station 110, a UE 120, and/or the like), a forwarding node 310 (e.g., a repeater device, a relay device, a base station 110, a UE 120, a millimeter wave (mmWave) repeater, a mmWave relay, a digital repeater, an analog repeater, a digital relay, an analog relay, and/or the like), and a second wireless node 315 (e.g., an IAB node, an IAB donor, a base station 110, a UE 120, another forwarding node 310, and/or the like). In some aspects, the first wireless node 305 and/or the second wireless node 315 may be aware of the forwarding node 310. In some aspects, the first wireless node 305 and/or the second wireless node 315 may be unaware of the forwarding node 310.

As shown in FIG. 3, the first wireless node 305 may have a communication 320 (e.g., a data communication, a control communication, and/or the like) to transmit to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the forwarding node 310. In some aspects, the first wireless node 305 may transmit the communication 320 directly to the forwarding node 310 (e.g., in a case where the first wireless node 305 is aware of the forwarding node 310). In some aspects, the forwarding node 310 may be configured (e.g., by a control node, by the second wireless node 315, and/or the like) to receive the communication 320 from the first wireless node 305 (e.g., in a case where the first wireless node 305 is unaware of the forwarding node 310).

As shown in FIG. 3, the communication 320 may arrive at the forwarding node 310 and be forwarded by the forwarding node 310. In some aspects, the forwarding node 310 is a repeater node (or repeater unit), and the repeater node may regenerate a signal of the communication 320. For example, the repeater node may receive a signal of the communication 320, extract tones from the signal, regenerate the signal based at least in part on the extracted tones, and transmit the regenerated signal. In some aspects, the forwarding node 310 is a relay node (or relay unit), and the relay node may generate a new signal based at least in part on a signal of the communication 320. For example, the relay node may receive a downlink signal that carries information associated with a communication (e.g., in-phase and quadrature (IQ) samples), generate a new signal based at least in part on the information, and transmit the new signal. As another example, the relay node may receive an uplink signal, generate a new signal that carries information associated with the uplink signal (e.g., IQ samples), and transmit the new signal.

In some cases, the indirect link 330 may be an access link, a side link, or a fronthaul link. For example, if the first wireless node 305 is a base station 110 and the second wireless node 315 is a UE 120, the indirect link 330 between the first wireless node 305 and the forwarding node 310 may be a fronthaul link. The indirect link 330 between the forwarding node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
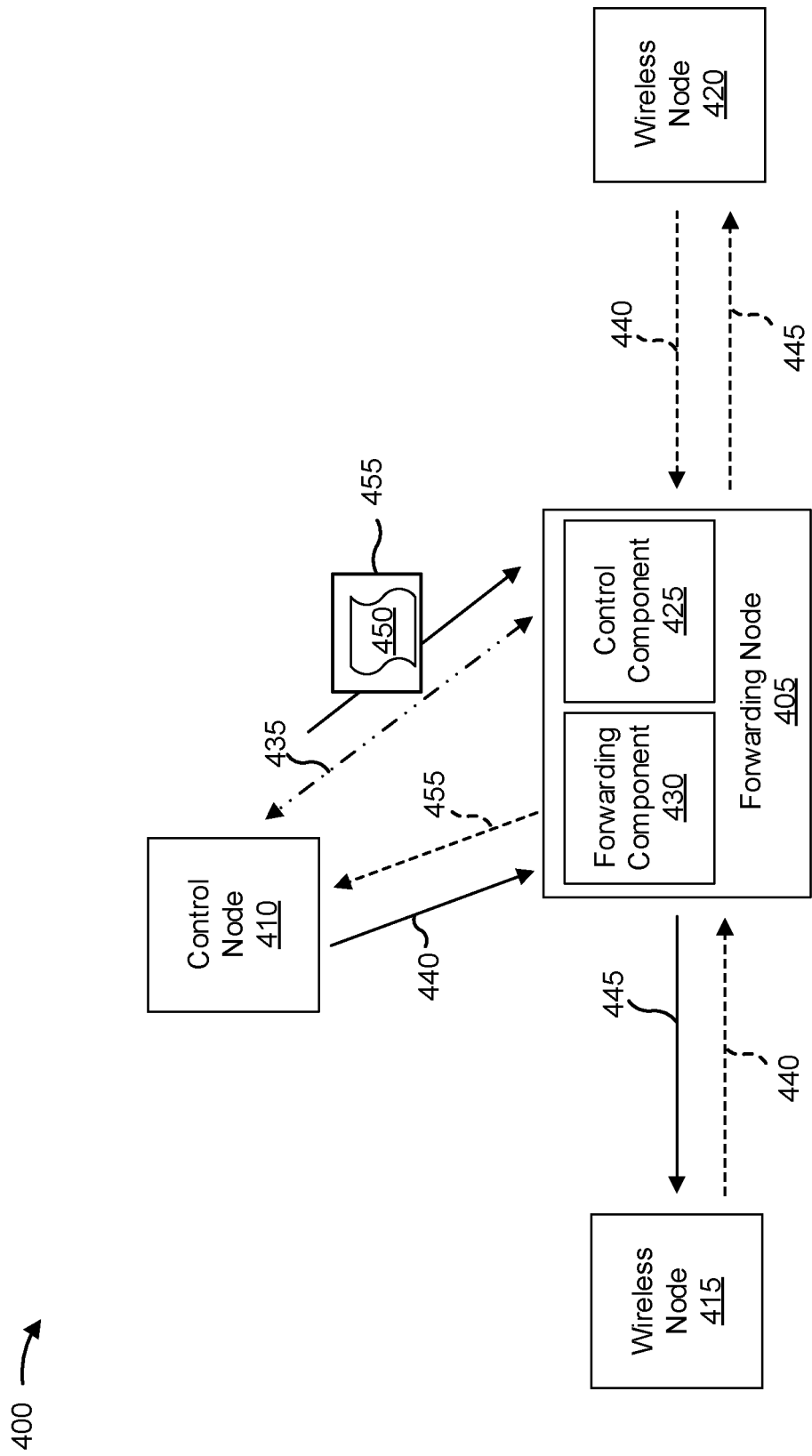
FIG. 4 is a diagram illustrating an example of forwarding a wireless signal using a forwarding node, in accordance with the present disclosure.

FIG. 4 is a diagram illustrating an example 400 of forwarding a wireless signal using a forwarding node 405, in accordance with the present disclosure. In some aspects, as shown, the forwarding node 405 may communicate with a control node 410 and one or more wireless nodes 415, 420 in a wireless network. In some aspects, the forwarding node 405 may include the forwarding node 310 shown in FIG. 3. In some aspects, the control node 410, the wireless node 415, and/or the wireless node 420 may be a wireless node such as, for example, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

In some aspects, the forwarding node 405 may be a digital repeater node (or repeater unit) configured to receive an incoming signal and to transmit a regenerated version of the incoming signal. For example, when implemented or otherwise configured as a digital repeater node, the forwarding node 405 may receive an incoming signal, extract tones from the incoming signal, regenerate the incoming signal based at least in part on the extracted tones, and transmit the regenerated signal as an outgoing signal. Additionally, or alternatively, the forwarding node 405 may be a digital relay node (or relay unit) configured to generate a new signal based at least in part on an incoming signal. For example, when implemented or otherwise configured as a digital relay node, the forwarding node 405 may receive a downlink signal (e.g., a fronthaul physical downlink shared channel (FH-PDSCH)) that carries information (e.g., IQ samples), generate a new downlink signal (e.g., a legacy physical downlink shared channel (PDSCH)) that carries information about and/or from the downlink signal (e.g., the IQ samples), and transmit the new downlink signal to a receiver. As another example, when implemented or otherwise configured as a digital relay node, the forwarding node 405 may receive an uplink signal (e.g., a legacy physical uplink shared channel (PUSCH)), generate a new uplink signal (e.g., an FH-PUSCH) that carries information associated with the uplink signal (e.g., IQ samples), and transmit the new uplink signal to a receiver.

As shown in FIG. 4, the forwarding node 405 may include a control component 425 and a forwarding component 430. In some aspects, the control component 425 may facilitate establishing a wireless control interface 435 between the forwarding node 405 and the control node 410. In some aspects, the control component 425 may include one or more components and/or functions that are, or are similar to, one or more components of a base station (e.g., the base station 110 shown in FIGS. 1 and 2), a UE (e.g., the UE 120 shown in FIGS. 1 and 2), and/or the like. In some aspects, the forwarding component 430 may perform one or more forwarding (e.g., repeating and/or relaying) operations based at least in part on information received by the control component over the wireless control interface 435. For example, a forwarding operation may include receiving a first signal 440, performing one or more digital processing operations on the first signal 440 to generate a second signal 445, and transmitting the second signal 445. The second signal 445 may be the result of the forwarding node 405 performing a repeating operation to regenerate the first signal 440 (e.g., through the one or more digital processing operations) such that $X' \approx X$, where X is the first signal 440 and X' is the second signal 445. Additionally, or alternatively, the second signal 445 may be the result of the forwarding node 405 performing a relaying operation. In this case, the forwarding node 405 may generate the second signal 445 to carry information about and/or from the first signal 440 (e.g., through the one or more digital processing operations) such that $Y=f(X)$, where X is the first signal 440, Y is the second signal 445, and f is a function based at least in part on one or more digital processing operations that the forwarding node 405 performs to generate the second signal 445.

In some aspects, the first signal 440 may include a communication (e.g., the communication 320 shown in FIG. 3) that is transmitted from the control node 410 and addressed to the wireless node 415. In some aspects, as shown, the first signal 440 may be transmitted from the control node 410 and addressed to the wireless node 415. In some aspects, the first signal 440 may be transmitted from the wireless node 415 or the wireless node 420 and addressed to the control node 410, addressed to the other wireless node 415 or wireless node 420, and/or the like. In some aspects, the first signal 440 may be addressed to a plurality of wireless nodes (e.g., wireless node 415, wireless node 420, control node 410, and/or the like). In some aspects, the first signal 440 may include a synchronization signal block (SSB) and/or remaining minimum system information (RMSI) communication, information associated with an SSB or RMSI communication, a physical downlink control channel (PDCCH) transmission, a PDSCH transmission, a physical uplink control channel (PUCCH) transmission, a PUSCH transmission, a physical sidelink control channel (PSCCH) transmission, a physical sidelink shared channel (PSSCH) transmission, an acknowledgement or negative acknowledgement (ACK/NACK) feedback message, and/or the like.

In some aspects, the forwarding component 430 may perform the one or more forwarding operations based at least in part on a configuration established using the control component 425. For example, in some aspects, the control node 410 may transmit configuration information 450 using a control message 455, and the forwarding node 405 may receive the control message 455 using the control component 425.

In some aspects, the control node 410 may transmit the configuration information 450 in the control message 455 via the wireless control interface 435. The configuration information 450 may be carried in at least one control message 455. In some aspects, control messages may be used to control communication between the forwarding node 405 and the control node 410 in accordance with a specification of the wireless control interface 435. In some aspects, the configuration information 450 may be carried in a lower-layer control message (e.g., a control message associated with physical layers and/or medium access control (MAC) layers), an upper-layer control message (e.g., a control message associated with network layers), an application-layer control message (e.g., a control message associated with an application layer), and/or the like. For example, a control message may be carried using a radio resource control (RRC) message, downlink control information (DCI), a MAC control element (MAC-CE), and/or the like.

In some aspects, a control message may be included within the first signal 440. In some aspects, the configuration information 450 may be carried in a fronthaul PDCCH (FH-PDCCH) control message. In some aspects, the FH-PDCCH control message may include DCI scrambled by a fronthaul radio network temporary identifier (FH-RNTI). The FH-RNTI may be associated with the control component 425.

In some aspects, the control message 455 may configure any number of different types of settings, configurations, digital processing operations, receiving operations, buffering operations, forwarding (transmitting) operations, and/or the like. In some aspects, the forwarding node 405 may transmit, and the control node 410 may receive, one or more control messages. For example, in some aspects, the forwarding node 405 may, using the control component 425, transmit a control message via the wireless control interface 435 to the control node 410. The control message transmitted by the forwarding node 405 may indicate a configuration, a capability, a status, and/or other information related to the forwarding node 405.

As indicated above, in some aspects, the control node 410 may configure the forwarding node 405 for a particular forwarding (e.g., repeating and/or relaying) operation by transmitting configuration information 450 to the forwarding node 405. In some aspects, the configuration information 450 may indicate a digital processing operation. The digital processing operation may include a digital processing option selected from a plurality of digital processing options (e.g., as described below in connection with FIG. 5 and FIGS. 6A-6B). In some aspects, the configuration information 450 may include one or more information elements (IEs) that indicate a reception configuration, a buffering configuration, a forwarding configuration, an information request, and/or the like.

In some aspects, the reception configuration may configure one or more receiving operations of the forwarding component 430 with respect to receiving the first signal 440. The reception configuration may indicate, for example, a receiving analog beamforming configuration, a time domain resource associated with the first signal 440, a frequency domain resource associated with the first signal 440, a numerology associated with the first signal 440, a digital receiver beamforming configuration, resource element (RE) mapping information associated with the first signal 440, a channel estimation configuration, a scrambling identifier associated with the first signal 440, a coding configuration associated with the first signal 440, and/or the like.

In some aspects, the buffering configuration may configure one or more buffering operations of the forwarding component 430 with respect to buffering a digitized form of the first signal 440. In some aspects, the buffering configuration may indicate an analog-to-digital converter (ADC) setting, a digital-to-analog converter (DAC) setting, an IQ sample compression setting, an IQ sample decompression setting, and/or the like.

In some aspects, the forwarding configuration may configure one or more forwarding operations of the forwarding component 430 with respect to transmitting the second signal 445, which may be a regenerated form of the first signal 440 or a new signal that carries information about and/or from the first signal 440. In some aspects, the forwarding configuration may include a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, a coding configuration associated with transmitting the second signal, and/or the like.

In some aspects, the information request may configure one or more reporting operations of the forwarding component 430 with respect to providing information to the control node 410. The information may include information about the operation of the forwarding node 405, the configuration of the forwarding node 405, settings of the forwarding node 405, a channel, a communication, and/or the like. In some aspects, the information request may include a request for a buffer status, a power status, a measurement report, a capability of the digital repeater, a configuration of the forwarding node 405, and/or the like.

As indicated above, FIG. 4 is provided as an example. Other examples may differ from what is described with respect to FIG. 4.

Figure 5:
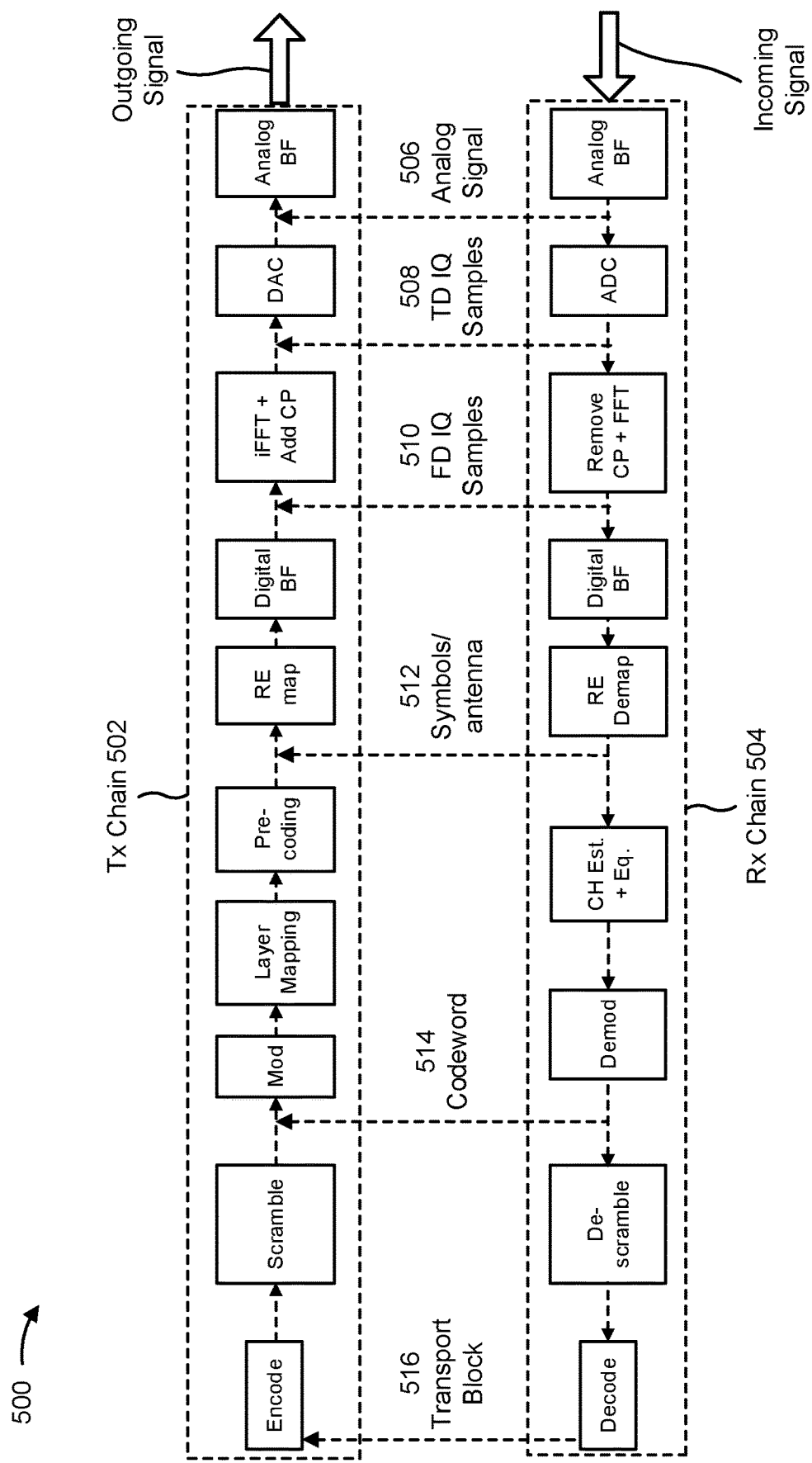
FIG. 5 is a diagram illustrating an example of a transmit (Tx) chain and a receive (Rx) chain of a forwarding node implemented as a repeater node, in accordance with the present disclosure.

FIG. 5 is a diagram illustrating an example 500 of a transmit (Tx) chain 502 and a receive (Rx) chain 504 of a forwarding node implemented as a repeater node, in accordance with the present disclosure.

In some aspects, one or more components of Tx chain 502 may be implemented in transmit processor 220, TX MIMO processor 230, MOD/DEMOD 232, controller/processor 240, and/or the like, as described above in connection with FIG. 2. In some aspects, Tx chain 502 may be implemented in a repeater node for transmitting an outgoing signal (e.g., uplink data, downlink data, an uplink reference signal, a downlink reference signal, uplink control information, downlink control information, and/or the like) associated with a repeating operation performed by the repeater node.

In some aspects, one or more components of Rx chain 504 may be implemented in receive processor 238, MIMO detector 236, MOD/DEMOD 232, controller/processor 240, and/or the like, as described above in connection with FIG. 2. In some aspects, Rx chain 504 may be implemented in a repeater node for receiving an incoming signal (e.g., downlink data, uplink data, a downlink reference signal, an uplink reference signal, downlink control information, uplink control information, and/or the like) associated with a repeating operation performed by the repeater node.

As shown in FIG. 5 and example 500, the incoming signal may be a downlink signal that is received over a fronthaul link from a DU of an IAB node, a base station 110, and/or the like, and the outgoing signal may be a regenerated version of the downlink signal that is transmitted over an access link to a mobile termination (MT) unit of an IAB node, a UE 120, and/or the like. Additionally, or alternatively, the incoming signal may be an uplink signal that is received over an access link from an MT unit of an IAB node, a UE 120, and/or the like, and the outgoing signal may be a regenerated version of the uplink signal that is transmitted over a fronthaul link to a DU of an IAB node, a base station 110, and/or the like. Accordingly, as described herein, repeating operations performed by the repeater node may be symmetric for downlink and uplink signals. Furthermore, in some aspects, the device transmitting the incoming signal and/or the device receiving the outgoing signal may be unaware of the repeater node (e.g., the repeating operations may be transparent to the transmitting device and/or the receiving device).

As shown in FIG. 5, the incoming signal may be processed by the Rx chain 504. For example, as described herein, the repeater node may perform different levels of analog and/or digital processing to regenerate the incoming signal as the outgoing signal. The level of processing performed by the repeater node may be based at least in part on a configuration received by the repeater node (e.g., from a control node and/or the like). For example, as shown by reference number 506 (which shows what may be referred to as Split Option 9), the repeater node may perform analog beamforming on the incoming signal, and may provide an analog signal to the Tx chain 502. The repeater node may then perform analog beamforming on the analog signal to transmit the outgoing signal to the receiving device. In this case, the repeater node may be configured as an analog repeater.

Additionally, or alternatively, the repeater node may be configured as a digital repeater, in which case the repeater node may further process the incoming signal. For example, as shown by reference number 508 (which shows what may be referred to as Split Option 8), the repeater node may process the analog signal by converting the incoming signal from the analog domain to the digital domain using an analog-to-digital converter (ADC) to determine time domain IQ samples associated with the incoming signal. Accordingly, in some aspects, the repeater node may process the time domain IQ samples using a digital-to-analog converter (DAC) to regenerate the analog signal, which is then transmitted using analog beamforming.

Additionally, or alternatively, as shown by reference number 510 (which shows what may be referred to as Split Option 7-1), the repeater node may further process the incoming signal to determine frequency domain IQ samples associated with the incoming signal by removing a cyclic prefix (CP) from the time domain IQ samples and performing a fast Fourier transform (FFT). In this case, the repeater node may generate the outgoing signal by then performing an inverse FFT (iFFT) on the frequency domain IQ samples and adding a CP to obtain time domain IQ samples, converting the time domain IQ samples to an analog signal using a DAC, and transmitting the analog signal using analog beamforming.

Additionally, or alternatively, as shown by reference number 512 (which shows what may be referred to as Split Option 7-2), the repeater node may further process the incoming signal to determine symbols per antenna (e.g., IQ symbols of occupied tones) associated with the incoming signal. For example, the repeater node may perform a digital beamforming process on the frequency domain IQ samples (e.g., based at least in part on a digital Tx beamforming configuration), and may further perform a resource element (RE) demapping based at least in part on an RE mapping configuration received by the repeater node to identify REs of the incoming signal and/or occupied tones. The repeater node may generate the outgoing signal by processing the symbols per antenna (e.g., IQ symbols of occupied tones) using an RE mapping and digital beamforming information.

Additionally, or alternatively, as shown by reference number 514 (which shows what may be referred to as Split Option 7-3), the repeater node may further process the incoming signal to determine a codeword (e.g., log likelihood ratio (LLR) values and/or the like) associated with the incoming signal. For example, the repeater node may determine the codeword by performing channel estimation and channel equalization on the IQ symbols of occupied tones (e.g., to identify and/or remove noise associated with the incoming signal) and by performing a demodulation procedure on the incoming signal. In this case, the repeater node may generate the outgoing signal by modulating the codeword, performing a layer mapping, applying pre-coding, performing an RE mapping, performing digital Tx beamforming, applying an iFFT and/or adding a CP, converting the signal from the digital domain to the analog domain using a DAC, and performing analog beamforming to transmit the outgoing signal.

Additionally, or alternatively, as shown by reference number 516 (which shows what may be referred to as Split Option 6), the repeater node may further process the incoming signal to obtain a transport block associated with the incoming signal (e.g., the repeater node may fully decode the incoming signal). For example, the repeater node may obtain the transport block by descrambling the codeword (e.g., using a scrambling identifier associated with the incoming signal) and decoding the descrambled codeword (e.g., based at least in part on an MCS associated with the incoming signal). In this case, the repeater node may generate the outgoing signal by encoding the transport block according to a Tx MCS, scrambling the encoded transport block to regenerate the codeword, modulating the codeword and performing a layer mapping and pre-coding to regenerate the symbols per antenna, performing an RE mapping and digital Tx beamforming to regenerate the frequency domain IQ samples, applying an iFFT and/or adding a CP to the frequency domain IQ samples to regenerate the time domain IQ samples, converting the time domain IQ samples from the digital domain to the analog domain with a DAC, and performing analog beamforming on the analog signal in the analog domain to transmit the outgoing signal.

In some aspects, the level of processing that the repeater node performs on the incoming signal may be configured by a control node or another wireless node. The outgoing signal may be a regenerated version of the incoming signal that is based at least in part on the level of processing performed by the repeater node.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6A:
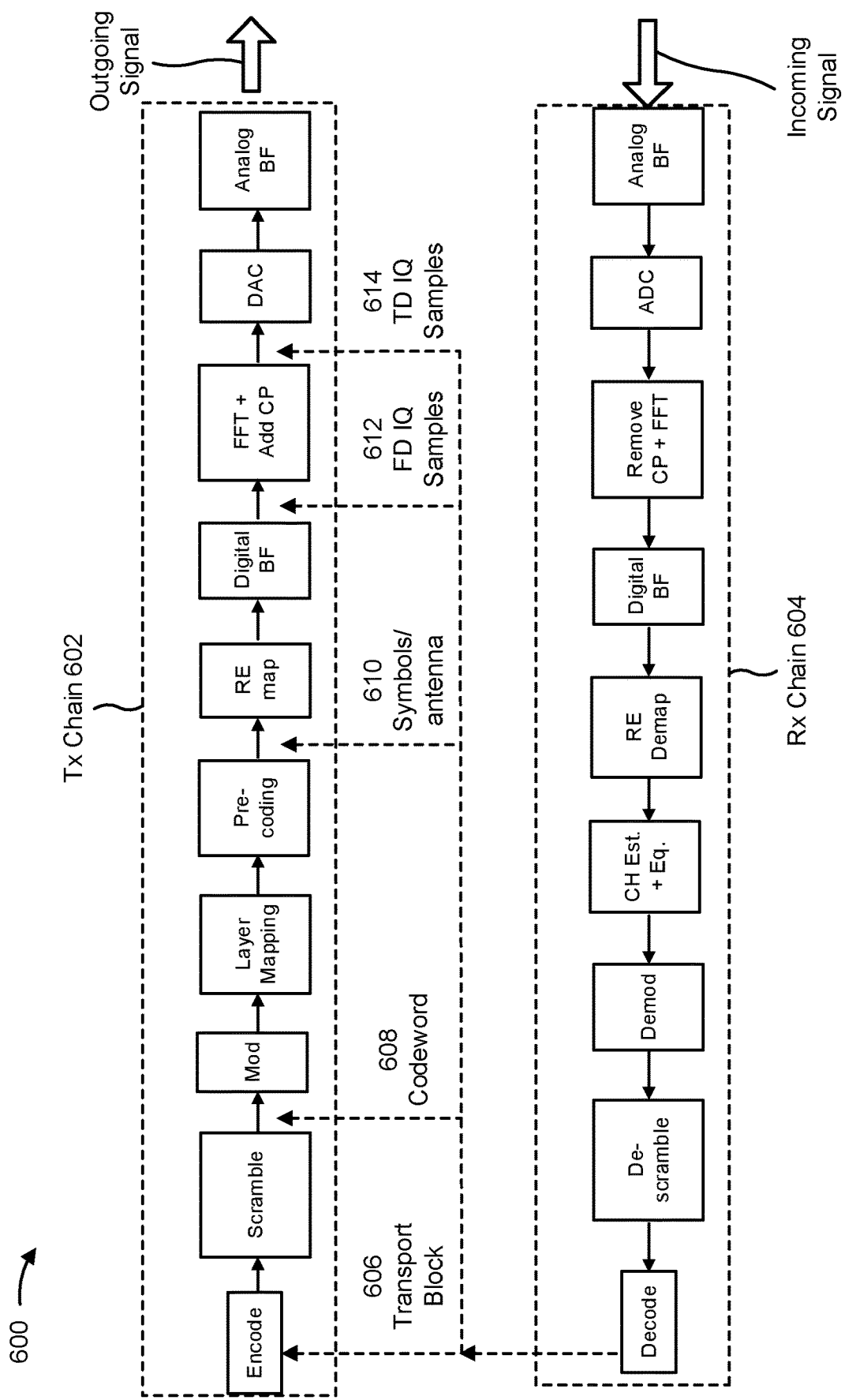
FIGS. 6A-6B are diagrams illustrating examples of a Tx chain and an Rx chain of a forwarding node implemented as a relay node, in accordance with the present disclosure.
Figure 6B:
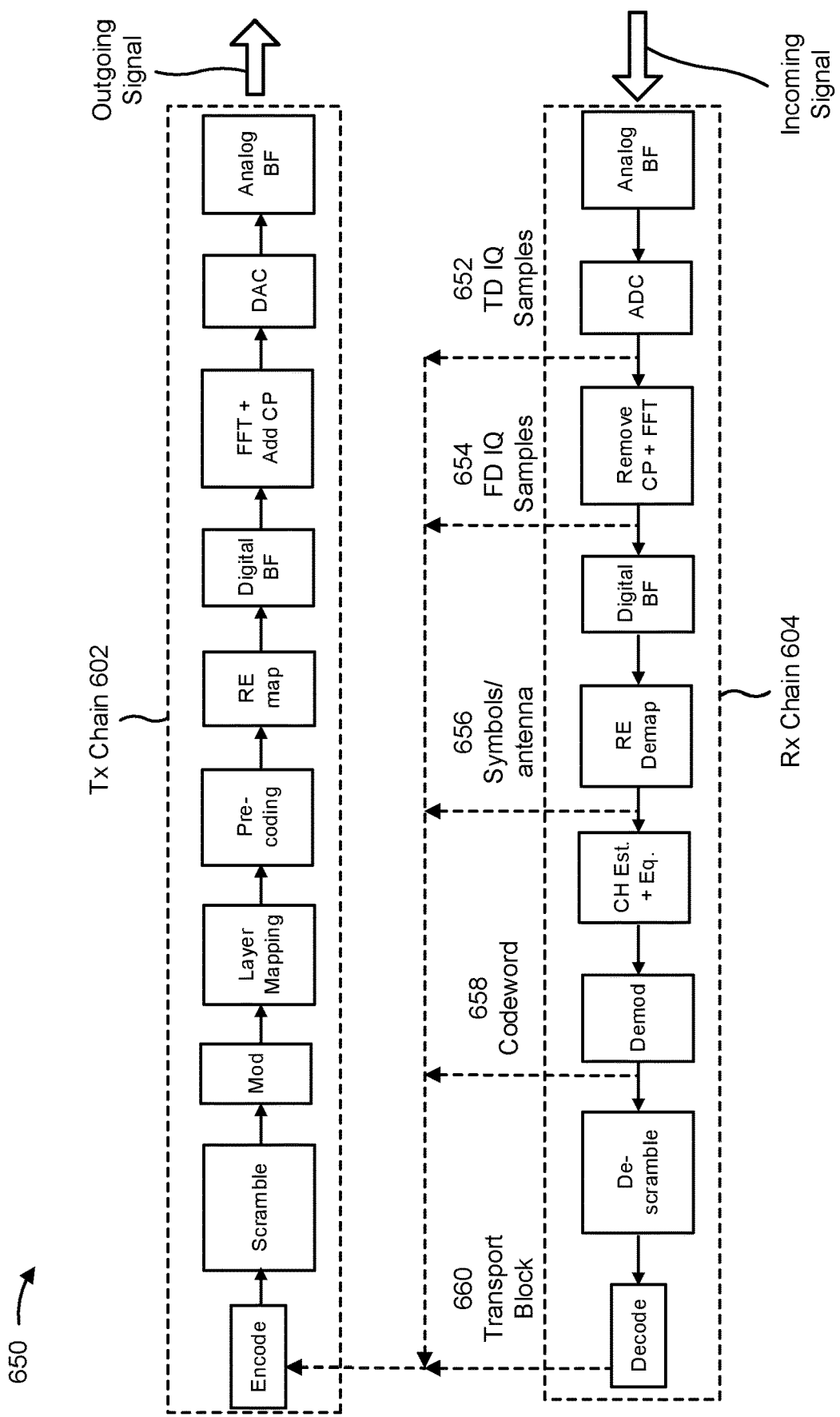

FIGS. 6A-6B are diagrams illustrating examples 600 and 650 of a Tx chain 602 and an Rx chain 604 of a forwarding node implemented as a relay node, in accordance with the present disclosure.

In some aspects, one or more components of Tx chain 602 may be implemented in transmit processor 220, TX MIMO processor 230, MOD/DEMOD 232, controller/processor 240, and/or the like, as described above in connection with FIG. 2. In some aspects, Tx chain 602 may be implemented in a relay node for transmitting an outgoing signal (e.g., uplink data, downlink data, an uplink reference signal, a downlink reference signal, uplink control information, downlink control information, and/or the like) associated with a relaying operation performed by the relay node.

In some aspects, one or more components of Rx chain 604 may be implemented in receive processor 238, MIMO detector 236, MOD/DEMOD 232, controller/processor 240, and/or the like, as described above in connection with FIG. 2. In some aspects, Rx chain 604 may be implemented in a relay node for receiving an incoming signal (e.g., downlink data, uplink data, a downlink reference signal, an uplink reference signal, downlink control information, uplink control information, and/or the like) associated with a relaying operation performed by the relay node.

As shown in FIG. 6A and example 600, the incoming signal may be received by the relay node over a fronthaul link. For example, the incoming signal may be a downlink signal received from a DU of an IAB node, a base station 110, and/or the like. As shown in FIG. 6A, the incoming signal may be processed by the Rx chain 604. For example, the relay node may fully decode the incoming signal to obtain information (e.g., a payload) carried in the incoming signal. The relay node may perform analog beamforming on the incoming signal. The relay node may convert the incoming signal from the analog domain to the digital domain using an ADC. The relay node may remove a CP and/or an FFT associated with the incoming signal. The relay node may perform a digital beamforming process on the incoming signal (e.g., based at least in part on a digital Tx beamforming configuration). The relay node may perform an RE de-mapping procedure based at least in part on an RE mapping configuration received by the relay node to identify REs of the signal and/or occupied tones. The relay node may perform channel estimation and channel equalization on the incoming signal (e.g., to identify and/or remove noise associated with the incoming signal). The relay node may perform a demodulation procedure on the incoming signal. The relay node may de-scramble the incoming signal (e.g., using scrambling IDs associated with the incoming signal). The relay node may decode the incoming signal (e.g., based at least in part on an MCS associated with the incoming signal).

After decoding the incoming signal, the relay node may identify information carried by the incoming signal. For example, a payload of the incoming signal may include time domain IQ samples, frequency domain IQ samples, symbols per antenna (e.g., IQ symbols of occupied tones), a codeword, a transport block, and/or the like. The relay node may generate an outgoing signal using the Tx chain 602. An amount or level of processing performed by the relay node associated with the Tx chain 602 may be based at least in part on the information carried by the incoming signal, a configuration received by the relay node (e.g., from a control node and/or the like), and/or the like.

As shown by reference number 606 (which shows Split Option 6), if the incoming signal is carrying a transport block, the relay node may generate the outgoing signal by fully encoding the transport block to form the outgoing signal (e.g., by encoding the transport block according to a Tx MCS, scrambling the encoded transport block, modulating the scrambled transport block, performing layer mapping, pre-coding, performing digital Rx beamforming, applying an FFT and/or adding a CP, converting the signal from the digital domain to the analog domain with a DAC, performing analog beamforming, and transmitting the outgoing signal).

As shown by reference number 608 (which shows Split Option 7-3), if the incoming signal is carrying a codeword, the relay node may not perform encoding or scrambling to generate the outgoing signal. That is, the relay node may modulate the codeword, perform layer mapping, perform pre-coding, perform digital Tx beamforming, apply an FFT and/or add a CP, convert the signal from the digital domain to the analog domain with a DAC, perform analog beamforming, and transmit the outgoing signal.

As shown by reference number 610 (which shows Split Option 7-2), if the incoming signal is carrying an indication of symbols per antenna (e.g., IQ symbols of occupied tones), the relay node may not perform encoding, scrambling, modulating, layer mapping, and/or pre-coding. That is, the relay node may perform digital Rx beamforming to the IQ symbols of occupied tones, apply an FFT and/or add a CP, convert the signal from the digital domain to the analog domain with a DAC, perform analog beamforming, and transmit the outgoing signal.

As shown by reference number 612 (which shows Split Option 7-1), if the incoming signal is carrying frequency domain IQ samples, the relay node may not perform encoding, scrambling, modulating, layer mapping, pre-coding, and/or digital beamforming. That is, the relay node may apply an FFT and/or add a CP to the frequency domain IQ samples, convert the signal from the digital domain to the analog domain with a DAC, perform analog beamforming, and transmit the outgoing signal.

As shown by reference number 614 (which shows Split Option 8), if the incoming signal is carrying time domain IQ samples, the relay node may not perform encoding, scrambling, modulating, layer mapping, pre-coding, digital beamforming, and/or applying an FFT and/or adding a CP. That is, the relay node may convert the time domain IQ samples from the digital domain to the analog domain with a DAC, perform analog beamforming, and transmit the outgoing signal.

As a result, the level of digital processing used to generate the outgoing signal may vary based at least in part on information carried by the incoming signal. As described above, the relay node may process the incoming signal to identify information included in a payload of the incoming signal. The relay node may generate an outgoing signal that includes information about and/or from the incoming signal based at least in part on the information carried by the incoming signal. In some aspects, a device receiving the outgoing signal may be unaware of the relay node (e.g., the relaying operations may be transparent to the receiving device).

As shown in FIG. 6B and example 650, the incoming signal may be received by the relay node over an access link. For example, the incoming signal may be an uplink signal received from an MT unit of an IAB node, a UE 120, and/or the like. In some aspects, the device transmitting the incoming signal may be unaware of the relay node (e.g., the relaying operations may be transparent to the transmitting device).

The relay node may perform different levels of digital processing to determine information associated with the incoming signal. The level of processing may be based at least in part on a configuration received by the relay node (e.g., from a control node and/or the like). For example, as shown by reference number 652 (which shows Split Option 8), the relay node may process the incoming signal to determine time domain IQ samples associated with the incoming signal. The relay node may generate the outgoing signal by processing the time domain IQ samples and including them in a payload of the outgoing signal (e.g., by fully encoding a transport block indicating the time domain IQ samples). The outgoing signal may be transmitted using a fronthaul link to another wireless node.

As shown by reference number 654 (which shows Split Option 7-1), the relay node may process the incoming signal to determine frequency domain IQ samples associated with the incoming signal. The relay node may generate the outgoing signal by processing the frequency domain IQ samples and including them in a payload of the outgoing signal (e.g., by fully encoding a transport block indicating the frequency domain IQ samples). The outgoing signal may be transmitted using a fronthaul link to another wireless node.

As shown by reference number 656 (which shows Split Option 7-2), the relay node may process the incoming signal to determine symbols per antenna (e.g., IQ symbols of occupied tones) associated with the incoming signal. The relay node may generate the outgoing signal by processing the symbols per antenna (e.g., IQ symbols of occupied tones) and including them in a payload of the outgoing signal (e.g., by fully encoding a transport block indicating the symbols per antenna (e.g., IQ symbols of occupied tones)). The outgoing signal may be transmitted using a fronthaul link to another wireless node.

As shown by reference number 658 (which shows Split Option 7-3), the relay node may process the incoming signal to determine a received codeword (e.g., LLR values and/or the like) associated with the incoming signal. The relay node may generate the outgoing signal by processing the received codeword and including it in a payload of the outgoing signal (e.g., by fully encoding a transport block indicating the received codeword). The outgoing signal may be transmitted using a fronthaul link to another wireless node.

As shown by reference number 660 (which shows Split Option 8), the relay node may process the incoming signal to determine a transport block associated with the incoming signal (e.g., the relay node may fully decode the incoming signal). The relay node may generate the outgoing signal by processing the transport block and including the transport block in a payload of the outgoing signal (e.g., by fully encoding a transport block). The outgoing signal may be transmitted using a fronthaul link to another wireless node.

The level of processing performed on the incoming signal may be configured by a control node or another wireless node. The outgoing signal may include information about and/or from the incoming signal based at least in part on the level of processing performed by the relay node.

The number and arrangement of components shown in FIGS. 6A-6B are provided as an example. In practice, there may be additional components, fewer components, different components, or differently arranged components than those shown in FIGS. 6A-6B. Furthermore, two or more components shown in FIGS. 6A-6B may be implemented within a single component, or a single component shown in FIGS. 6A-6B may be implemented as multiple, distributed components. Additionally, or alternatively, a set of components (e.g., one or more components) shown in FIGS. 6A-6B may perform one or more functions described as being performed by another set of components shown in FIGS. 6A-6B.

Figure 7:
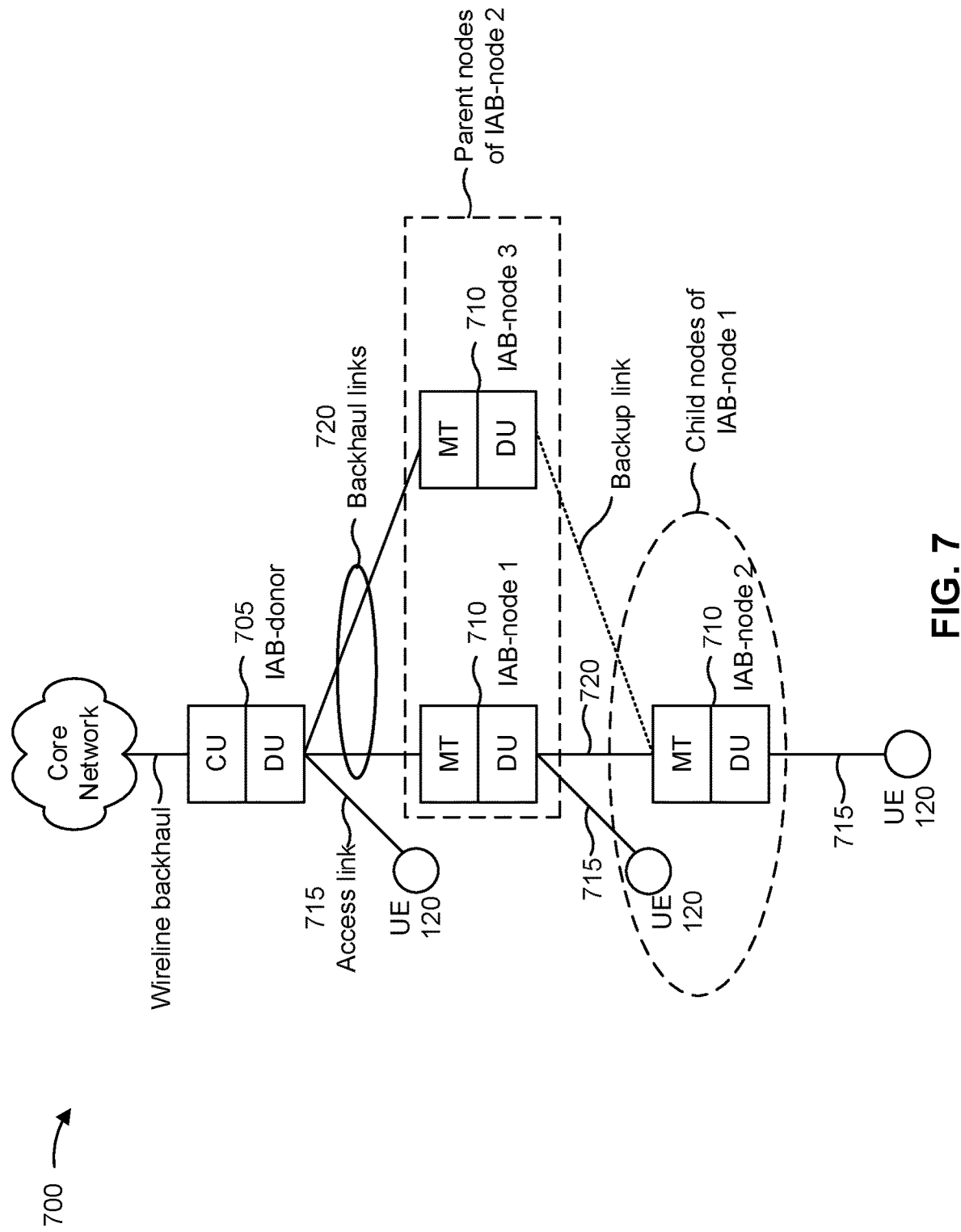
FIG. 7 is a diagram illustrating an example of an integrated access and backhaul network architecture, in accordance with the present disclosure.

FIG. 7 is a diagram illustrating an example 700 of an IAB network architecture, in accordance with the present disclosure.

As shown in FIG. 7, an IAB network may include an IAB donor 705 (shown as IAB-donor) that connects to a core network via a wired connection (shown as a wireline backhaul). For example, an Ng interface of an IAB donor 705 may terminate at a core network. Additionally, or alternatively, an IAB donor 705 may connect to one or more devices of the core network that provide a core access and mobility management function (e.g., AMF). In some aspects, an IAB donor 705 may include a base station 110, such as an anchor base station that communicates with a core network via a wired backhaul link (e.g., a fiber connection). As shown, an IAB donor 705 may include a central unit (CU), which may perform access node controller (ANC) functions, AMF functions, and/or the like. The CU may configure a distributed unit (DU) of the IAB donor 705 and/or may configure one or more IAB nodes 710 (e.g., an MT and/or a DU of an IAB node 710) that connect to the core network via the IAB donor 705. Thus, a CU of an IAB donor 705 may control and/or configure the entire IAB network that connects to the core network via the IAB donor 705, such as by using control messages and/or configuration messages (e.g., an RRC configuration message, an F1 application protocol (FLAP) message, and/or the like).

As further shown in FIG. 7, the IAB network may include IAB nodes 710 (shown as IAB-node 1, IAB-node 2, and IAB-node 3) that connect to the core network via the IAB donor 705. As shown, an IAB node 710 may include mobile termination (MT) functions (also sometimes referred to as UE functions (UEF)) and may include DU functions (also sometimes referred to as access node functions (ANF)). The MT functions of an IAB node 710 (e.g., a child node) may be controlled and/or scheduled by another IAB node 710 (e.g., a parent node of the child node) and/or by an IAB donor 705. The DU functions of an IAB node 710 (e.g., a parent node) may control and/or schedule other IAB nodes 710 (e.g., child nodes of the parent node) and/or UEs 120. Thus, a DU may be referred to as a scheduling node or a scheduling component, and an MT may be referred to as a scheduled node or a scheduled component. In some aspects, an IAB donor 705 may include DU functions and not MT functions. That is, an IAB donor 705 may configure, control, and/or schedule communications of IAB nodes 710 and/or UEs 120. A UE 120 may include only MT functions, and not DU functions. That is, communications of a UE 120 may be controlled and/or scheduled by an IAB donor 705 and/or an IAB node 710 (e.g., a parent node of the UE 120).

When a first node controls and/or schedules communications for a second node (e.g., when the first node provides DU functions for the MT functions of the second node), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 705 or an IAB node 710, and a child node may be an IAB node 710 or a UE 120. Communications of an MT function of a child node may be controlled and/or scheduled by a parent node of the child node.

As further shown in FIG. 7, a link between a UE 120 (e.g., which only has MT functions, and not DU functions) and an IAB donor 705, or between a UE 120 and an IAB node 710, may be referred to as an access link 715. Access link 715 may be a wireless access link that provides a UE 120 with radio access to a core network via an IAB donor 705, and optionally via one or more IAB nodes 710. Thus, the IAB network architecture illustrated in FIG. 7 may be referred to as a multi-hop network and/or a wireless multi-hop network, among other examples.

As further shown in FIG. 7, a link between an IAB donor 705 and an IAB node 710 or between two IAB nodes 710 may be referred to as a backhaul link 720. Backhaul link 720 may be a wireless backhaul link that provides an IAB node 710 with radio access to a core network via an IAB donor 705, and optionally via one or more other IAB nodes 710. In an IAB network, network resources for wireless communications (e.g., time resources, frequency resources, spatial resources, and/or the like) may be shared between access links 715 and backhaul links 720. In some aspects, a backhaul link 720 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 725 between IAB-node 2 and IAB-node 3 may be used for backhaul communications if a primary backhaul link between IAB-node 2 and IAB-node 1 fails. As used herein, "node" or "wireless node" may refer to an IAB donor 705 and/or an IAB node 710, among other examples.

Accordingly, in some communications systems, such as 5G or NR, a multi-hop network such as an IAB network may be deployed to enable communication between wireless nodes of the network. In general, the wireless nodes that are deployed in the multi-hop network may be associated with a timing scheme or timing configuration that enables alignment of communications between wireless nodes associated with different links. For example, one or more timing references may be used to identify a set of communication opportunities, such as a set of symbols or a set of slots that are allocated for a set of channels. For example, in an IAB network, the timing references may include a downlink transmit timing that an upstream node (e.g., a DU of an IAB donor 705 and/or a DU of an IAB node 710) uses to transmit one or more downlink signals to a downstream node (e.g., a UE 120 and/or an MT of a child IAB node 710). Furthermore, the timing references may include a downlink receive timing that the downstream node uses to receive the downlink signals from the upstream node, an uplink transmit timing that the downstream node uses to transmit uplink signals to the upstream node, and/or an uplink receive timing that the upstream node uses to receive the uplink signals from the downstream node. The downlink transmit timing may generally be aligned across all upstream nodes, and a threshold time misalignment may be tolerated for the uplink transmit timing to account for different propagation delays and/or round-trip times between upstream and downstream nodes.

Some aspects described herein enable a timing framework to manage various timing references for a wireless forwarding node deployed in a multi-hop network (e.g., to extend coverage of a base station and/or enable communication between two nodes that may otherwise be outside of wireless communication range). For example, in some aspects, the wireless forwarding node may include an MT unit to communicate with an upstream wireless node over a fronthaul link, and a remote unit (RU) (e.g., a repeater unit or a relay unit) to communicate with a downstream wireless node over an access link or a service link. Accordingly, some aspects described herein relate to techniques to configure a set of timing references for the wireless forwarding node, which may include a downlink receive timing and an uplink transmit timing that the MT unit uses to communicate with the upstream wireless node, and a downlink transmit timing and an uplink receive timing that the RU uses to communicate with the downstream wireless node. Additionally, or alternatively, the wireless forwarding node may be implemented with a separation whereby the MT unit communicates with a control node (which may be the same or different from the upstream wireless node) over the fronthaul link to exchange control information (e.g., to configure forwarding operations), and the RU may communicate with both the upstream wireless node and the downstream wireless node to perform forwarding operations. In this case, the wireless forwarding node may be associated with up to six different timing references, which may include a downlink receive timing and an uplink transmit timing that the MT unit uses to communicate with the control node, and a downlink receive timing, an uplink transmit timing, a downlink transmit timing, and an uplink transmit timing that the RU uses to forward communications between the upstream and downstream wireless nodes. In this way, the alignment of the timing references may increase synchronization among different nodes in the multi-hop network, which may increase accuracy of positioning determinations, increase a number of hops supported in the multi-hop network, and/or reduce interference in the multi-hop network, among other examples.

As indicated above, FIG. 7 is provided as an example. Other examples may differ from what is described with regard to FIG. 7.

Figure 8:
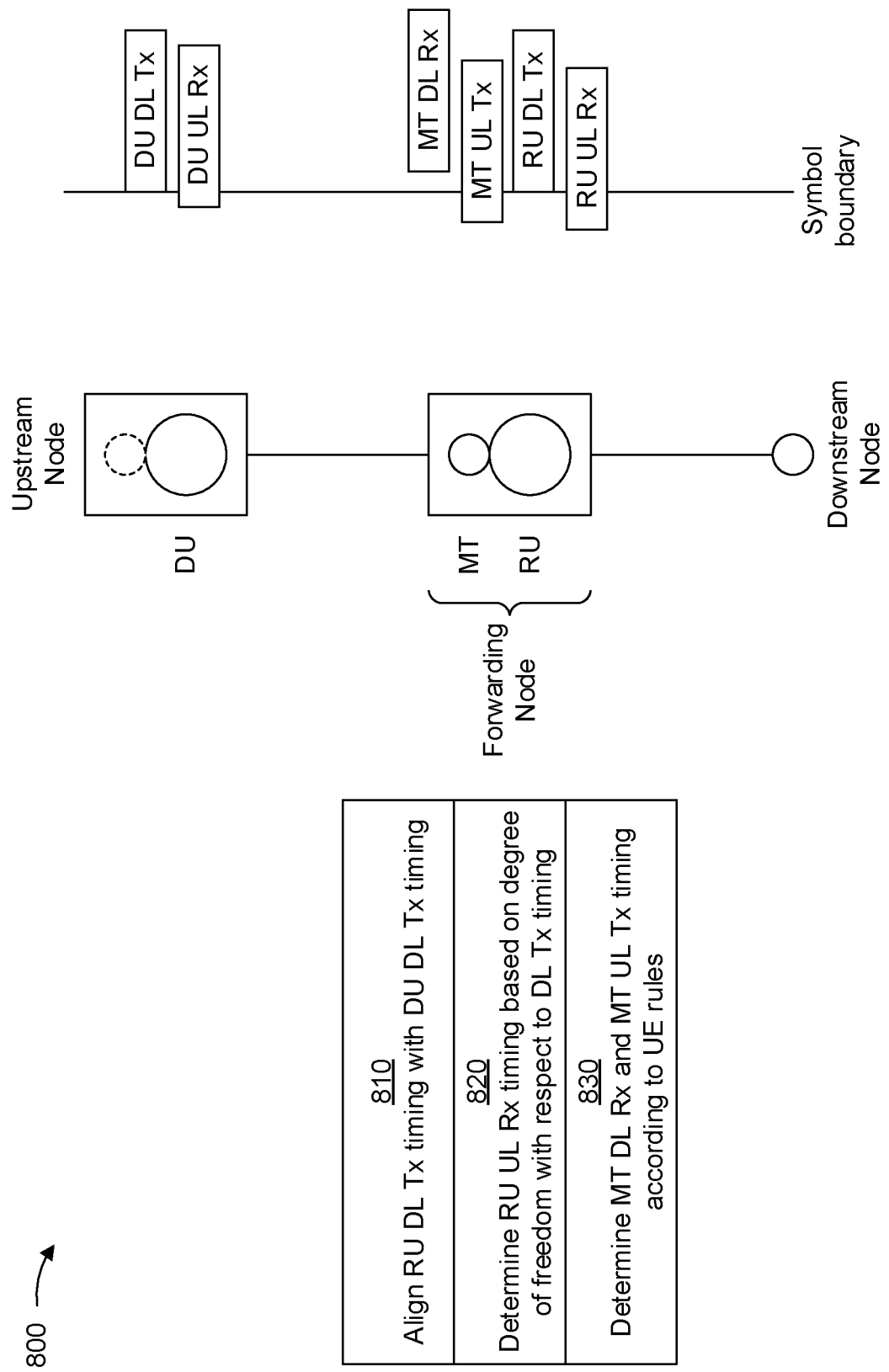
FIGS. 8-10 are diagrams illustrating examples associated with timing management for wireless remote units, in accordance with the present disclosure.

FIG. 8 is a diagram illustrating an example 800 associated with timing management for wireless remote units, in accordance with the present disclosure. As shown in FIG. 8, example 800 includes a wireless forwarding node configured to forward communications between an upstream wireless node (e.g., a base station DU and/or a DU of a donor node or a parent node, among other examples) and a downstream wireless node (e.g., a UE and/or an MT of a child node, among other examples). For example, as shown in FIG. 8, the wireless forwarding node may include an MT unit configured to receive downlink communications from the upstream wireless node, and an RU (e.g., a repeater unit and/or a relay unit) configured to receive uplink communications from the downstream wireless node. Accordingly, as described herein, the wireless forwarding node may use the MT unit to forward the uplink communications to the upstream wireless node, and may use the RU to forward the downlink communications to the downstream wireless node. Although various aspects described herein relate to a timing management framework used to forward downlink and uplink communications between upstream and downstream wireless nodes, it will be appreciated that the same or similar techniques may be used when the wireless forwarding node is deployed in a flat, non-hierarchical topology (e.g., to forward sidelink communications between a first UE and a second UE).

As shown in FIG. 8, the MT of the wireless forwarding node may be in communication with the upstream wireless node, which may correspond to a parent node or a donor node (e.g., a base station DU), a UE, and/or another suitable device using the wireless forwarding node to extend coverage. Furthermore, the RU of the wireless forwarding node may be in communication with the downstream wireless node, which may correspond to a UE, a child node, and/or another suitable device in a next hop that is communicating with the upstream wireless node through the wireless forwarding node. Accordingly, in order to transmit a downlink signal to the downstream wireless node, the upstream wireless node may transmit the downlink signal to the MT of the wireless forwarding node, and the wireless forwarding node may use the co-located RU to perform digital processing on the downlink signal (e.g., depending on the split option implemented by the RU) and forward the downlink signal to the downstream wireless node. Furthermore, similar techniques may be used for forwarding in the uplink direction, whereby the downstream wireless node may transmit an uplink signal to the RU of the wireless forwarding node, which may perform digital processing on the uplink signal (e.g., depending on the split option implemented by the RU) before using the MT to forward the uplink signal to the upstream wireless node.

Accordingly, in some aspects, a timing management configuration may define timing references that the MT uses to receive downlink signals from the upstream wireless node and to transmit uplink signals to the upstream wireless node, and/or timing references that the RU uses to transmit downlink signals to the downstream wireless node and to receive uplink signals from the downstream wireless node. For example, as described in further detail herein, the timing management configuration may generally indicate an alignment for one or more symbol boundaries that are associated with the wireless forwarding node forwarding downlink communications from the upstream wireless node to the downstream wireless node, forwarding uplink communications from the downstream wireless node to the upstream wireless node, and/or the like.

For example, as shown in FIG. 8, and by reference number 810, the wireless forwarding node may be associated with a timing management configuration in which a downlink transmit timing associated with the wireless forwarding node is aligned with a downlink transmit timing associated with the upstream wireless node. In other words, a symbol boundary associated with a downlink transmission by the upstream wireless node (e.g., to the wireless forwarding node and/or the downstream wireless node) may be aligned with a symbol boundary associated with a downlink transmission by the wireless forwarding node (e.g., to the downstream wireless node). For example, in some aspects, a control node (which may correspond to the upstream wireless node, a donor or parent node of the upstream wireless node, a network controller, and/or the like) may indicate the downlink transmit timing reference of the upstream wireless node to the wireless forwarding node. Additionally, or alternatively, the wireless forwarding node may determine the downlink transmit timing reference of the upstream wireless node based on a downlink receive timing of the MT of the wireless forwarding node and an uplink transmit timing of the MT of the wireless forwarding node, which is indicated by a control node in a timing advance command. For example, a delta between the downlink receive timing of the MT and the uplink transmit timing of the MT may correspond to a round trip time between the upstream wireless node and the MT of the wireless forwarding node. Accordingly, a propagation delay between the upstream wireless node and the wireless forwarding node may be half of the round trip time, whereby the wireless forwarding node may determine the downlink transmit timing for the RU based on the delta between the downlink receive timing of the MT and the uplink transmit timing indicated in the timing advance command from the control node.

Accordingly, in some aspects, a downlink transmit timing may be aligned among the wireless forwarding node and all DUs in a wireless network that includes the wireless forwarding node and the DU associated with the upstream wireless node. For example, FIG. 8 illustrates a vertical line that corresponds to a symbol boundary that is used to align a downlink transmit timing among the wireless forwarding node and all DUs in a wireless network that includes the wireless forwarding node and the DU associated with the upstream wireless node. Accordingly, as shown, the DU downlink transmit timing and the RU downlink transmit timing are both aligned with the same symbol boundary, whereby downlink transmissions by the upstream wireless node (e.g., to the wireless forwarding node) and downlink transmissions by the wireless forwarding node (e.g., to the downstream wireless node) generally occur at the same time.

As further shown in FIG. 8, and by reference number 820, the wireless forwarding node may determine an uplink receive timing for receiving uplink signals from the downstream wireless node based on a degree of freedom with respect to the downlink transmit timing. For example, in some aspects, an uplink receive timing of the upstream wireless node (shown as DU UL Rx) may be approximately aligned with a symbol boundary of the downlink transmit timing. However, the upstream wireless node may permit uplink transmissions to be received within a threshold time before or after the symbol boundary that is aligned with the downlink transmit timing. Accordingly, uplink transmissions from the MT of the wireless forwarding node to the upstream wireless node may be performed earlier than the symbol boundary that is aligned with the downlink transmit timing, to account for a propagation delay between the wireless forwarding node and the upstream wireless node, and uplink reception by the RU may be advanced from the uplink transmit timing of the MT accordingly (e.g., to account for a digital processing latency of the wireless forwarding node).

As further shown in FIG. 8, and by reference number 830, a downlink receive timing and an uplink transmit timing for the wireless forwarding node (e.g., the MT of the wireless forwarding node) may be determined according to one or more rules that are generally applicable to UEs. For example, a downlink receive timing associated with the MT of the wireless forwarding node may be offset (e.g., delayed) with respect to the downlink transmit timing of the DU of the upstream wireless node, and the offset may be based at least in part on a propagation delay between the upstream wireless node and the wireless forwarding node. For example, in some aspects, the upstream wireless node may be configured to transmit one or more downlink reference signals (e.g., a synchronization signal block (SSB), a channel state information reference signal (CSI-RS), a demodulation reference signal (DMRS), a tracking reference signal (TRS), and/or the like), and the MT of the wireless forwarding node may track the downlink receive timing based on the downlink reference signal transmissions. Furthermore, an uplink transmit timing for forwarding an uplink signal from the downstream wireless node to the upstream wireless node may be determined based at least in part on one or more timing advance commands received from a control node. For example, as described above, the upstream wireless node may permit uplink transmissions to be received within a threshold time before or after the symbol boundary that is aligned with the downlink transmit timing, and uplink transmissions may be scheduled to occur prior to the symbol boundary (e.g., based on the propagation delay) such that uplink transmissions are received at the upstream wireless node within the threshold time of the symbol boundary associated with downlink transmissions. Accordingly, in some aspects, the wireless forwarding node may receive one or more timing advance commands from the control node to indicate the time when uplink transmissions to the upstream wireless node are to occur, which may be based on a propagation delay and/or round trip time between the wireless forwarding node and the upstream wireless node.

As indicated above, FIG. 8 is provided as an example. Other examples may differ from what is described with regard to FIG. 8.

Figure 9:
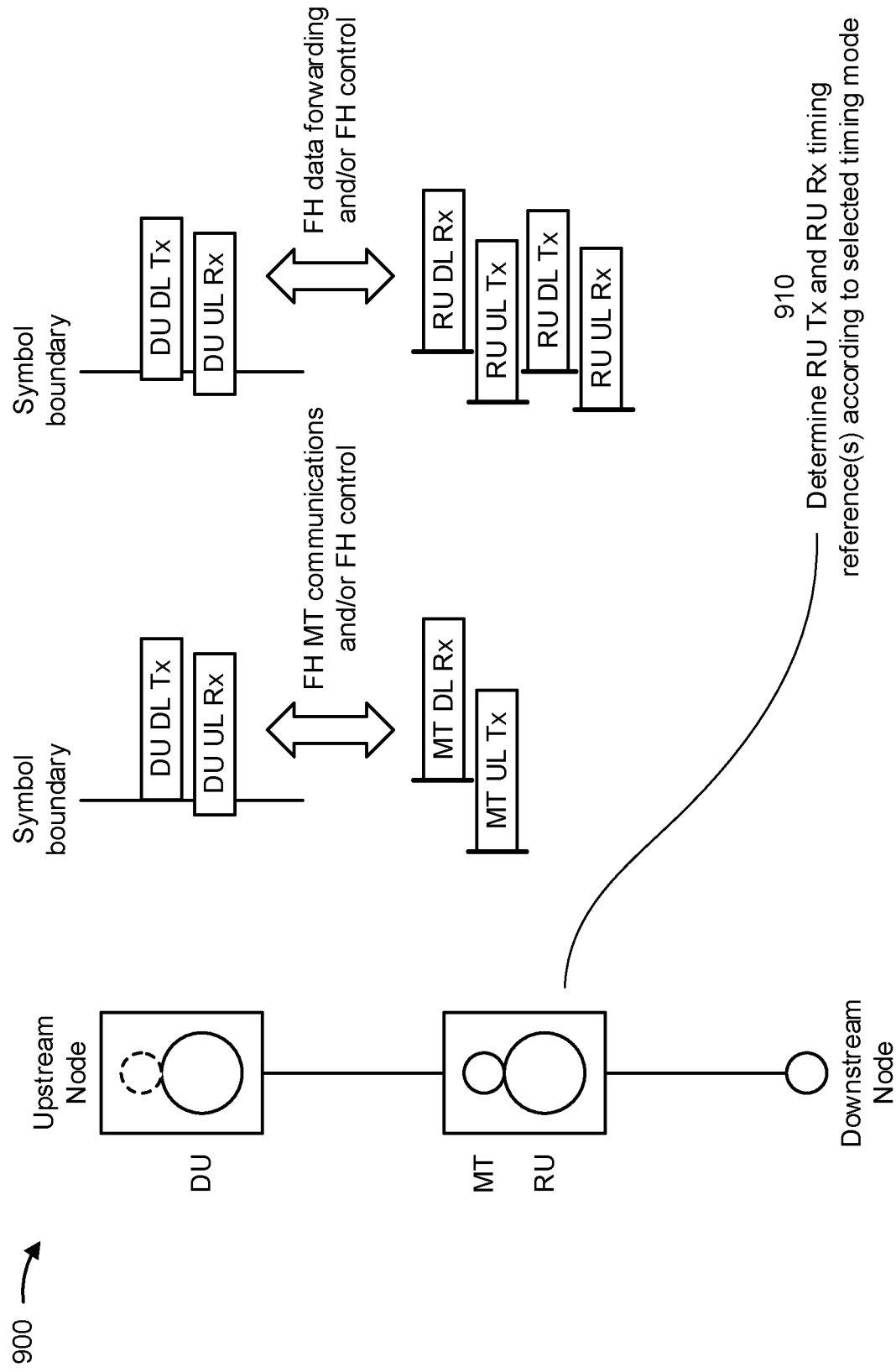

FIG. 9 is a diagram illustrating an example 900 associated with timing management for wireless remote units, in accordance with the present disclosure. As shown in FIG. 9, example 900 includes a wireless forwarding node configured to forward communications between an upstream wireless node (e.g., a base station DU and/or a DU of a donor node or a parent node, among other examples) and a downstream wireless node (e.g., a UE and/or an MT of a child node, among other examples). As shown in FIG. 9, the wireless forwarding node may include an MT unit configured to communicate with the upstream wireless node and an RU (e.g., a repeater unit and/or a relay unit) configured to communicate with the downstream wireless node. Furthermore, in some aspects, the RU of the wireless forwarding node may additionally communicate with the upstream wireless node. Accordingly, as described herein, the wireless forwarding node may have four or six different transmit/receive timing references, which may depend on whether the RU is a repeater unit or a relay unit.

For example, regardless of whether the RU is a repeater unit that forwards communications using the techniques described above with respect to FIG. 5 or a relay unit that forwards communications using the techniques described above with respect to FIGS. 6A-6B, the MT of the wireless forwarding node may be used to exchange control information with a control node (e.g., the upstream wireless node or another node that controls operation of the wireless forwarding node). Accordingly, the MT of the wireless forwarding node may include a downlink receive timing reference for receiving downlink transmissions from the control node and an uplink transmit timing reference for transmitting uplink transmissions to the control node. Furthermore, the RU of the wireless forwarding node may generally communicate with the downstream wireless node, and may therefore include a downlink transmit timing reference for transmitting (forwarded) downlink signals to the downstream wireless node and an uplink receive timing reference for receiving uplink signals to be forwarded to the upstream wireless node. Accordingly, whether the RU is implemented as a repeater unit or a relay unit, the wireless forwarding node may include at least four timing references to synchronize communication between the MT and the upstream wireless node (and/or control node) and to synchronize communication between the RU and the downstream wireless node.

However, in cases where the upstream wireless node transmits a downlink signal that is intended to be received by (e.g., forwarded to) the downstream wireless node, the signal processing performed by the RU may differ, depending on whether the RU is implemented as a relay unit or a repeater unit. For example, as described above with respect to FIG. 6A, a relay unit may always fully decode an incoming downlink signal to be forwarded, with a level of digital signal processing performed to generate a new signal based on the decoded downlink signal depending on the split option implemented at the relay unit. However, in cases where the RU is implemented as a repeater unit, the level of digital signal processing performed by the repeater unit may be symmetric for uplink and downlink signals, and in some cases may include partial processing to only extract time domain IQ samples, frequency domain IQ samples, symbols per antenna, or a codeword from the incoming downlink signal depending on the split option implemented by the repeater unit.

Accordingly, in such cases, the wireless forwarding node may differentiate received downlink signals that are to be digitally processed and forwarded to the downstream wireless node from received downlink signals intended to be fully decoded and consumed by the wireless forwarding node (e.g., to control operation of the wireless forwarding node). In other words, when the RU is implemented as a repeater unit, the wireless forwarding node may perform different levels of digital signal processing for signals that the wireless forwarding node is to forward and signals that the wireless forwarding node is to consume. In such cases, the wireless forwarding node may configure the MT to only communicate with the control node to receive and/or transmit control signals, and may configure additional downlink receive and uplink transmit timing references that the RU uses for data forwarding communications with the upstream wireless node. For example, as shown in FIG. 9, the RU may include a downlink receive timing reference and an uplink transmit timing reference for communicating with the upstream wireless node, in addition to a downlink transmit timing reference and an uplink receive timing reference for communicating with the downstream wireless node. In such cases, where the wireless forwarding node implements a separation between control communications between the MT and the control node (which may be the same or different from the upstream wireless node) and data forwarding communications between the RU and the upstream wireless node, the wireless forwarding node may have a total of six different timing references (e.g., two for the MT and four for the RU).

Accordingly, as described herein, different timing modes may be used to configure the various timing references associated with the wireless forwarding node. For example, in each timing mode, the MT of the wireless forwarding node may include a downlink receive timing reference (shown as MT DL Rx) and an uplink timing reference (shown as MT UL Tx) used to communicate with a control node and/or the upstream wireless node, which may generally be configured according to UE rules as described in more detail above with respect to FIG. 8. Furthermore, two or four different timing references may be configured for the RU of the wireless forwarding node.

For example, as shown by reference number 910, one or more transmit timing references and one or more receive timing references may determined according to a particular timing mode that is selected or otherwise configured to control operation of the wireless forwarding node. For example, in some aspects, the timing mode applied by the wireless forwarding node may be predefined (e.g., in a wireless communications standard, stored configuration information, and/or the like), or the timing mode applied by the wireless forwarding node may be signaled by the control node (e.g., as described in more detail below with reference to FIG. 10).

In some aspects, in a first timing mode configuration, downlink transmissions may be synchronized from a network point of view, whereby a downlink transmit timing associated with the RU of the wireless forwarding node may be aligned with a downlink transmit timing associated with the upstream wireless node. Accordingly, the first timing mode configuration may use similar techniques as described above with respect to FIG. 8, where downlink transmissions by all network nodes may be synchronized in a wireless network in which the wireless forwarding node is forwarding communications between the upstream wireless node and the downstream wireless node. For example, the upstream wireless node may be a first network node (e.g., a base station DU) and the wireless forwarding node may be a second network node, whereby the downlink transmit timing of the wireless forwarding node is aligned with the downlink transmit timing of the upstream wireless node. In this case, as described above, the uplink receive timing of the RU may similarly be determined based on a degree of freedom with respect to the symbol boundary aligned with the downlink transmit timing. Furthermore, because downlink transmissions are synchronized across the wireless network, and a propagation delay or round-trip time between the wireless forwarding node and the upstream wireless node may be the same regardless of whether a control or data signal is communicated between the wireless forwarding node and the upstream wireless node, the downlink receive timing of the RU may be the same as the downlink receive timing of the MT and the uplink transmit timing of the RU may be the same as the uplink transmit timing of the MT.

Alternatively, in some aspects, the RU may support downlink and/or uplink forwarding with almost zero delay (e.g., with a minimal digital processing latency, depending on a level of digital signal processing performed on an incoming signal to be forwarded). For example, when the RU is implemented as a repeater unit, an incoming downlink or uplink signal may be received and forwarded as an analog signal (e.g., split option 9), after converting the incoming signal to a digital domain and performing digital-to-analog conversion on time domain IQ samples extracted from the incoming signal (e.g., split option 8), and/or the like. Similarly, when the RU is implemented as a relay unit, a digital processing latency of the RU on the downlink may depend on the split option implemented at the RU to forward a downlink signal that is always fully decoded by an Rx chain, and a digital processing latency of the RU on the uplink may depend on the split option implemented at the RU to process an uplink signal that is always fully encoded by a Tx chain.

Accordingly, in cases where the RU supports almost zero-delay forwarding (e.g., where the digital processing latency of the RU is less than or equal to a threshold to support a minimal end-to-end latency between the upstream wireless node and the downstream wireless node), the downlink transmit timing of the RU may be aligned with the downlink receive timing of the RU plus epsilon, where epsilon represents the level of digital processing that the RU performs on an incoming downlink signal to be forwarded. Furthermore, the uplink transmit timing of the RU may be aligned with the uplink receive timing of the RU plus epsilon, where epsilon represents the level of digital processing that the RU performs on an incoming uplink signal to be forwarded. In some cases (e.g., where the RU is implemented as a repeater unit that performs symmetric repeating operations for downlink and uplink signals), the value of epsilon may be the same for the downlink transmit timing reference and the uplink transmit timing reference. Furthermore, in cases where the downlink transmit timing of the RU may be aligned with the downlink receive timing of the RU plus epsilon, the downlink transmit timing of the upstream wireless node may be advanced to compensate for epsilon (e.g., the digital processing latency of the wireless forwarding node). In this way, from a perspective of the downstream wireless node, downlink signals that are transmitted by the wireless forwarding node may be aligned with downlink signals that are transmitted by the upstream wireless node (and/or other network nodes).

In some aspects, the downstream wireless node may be in communication with both the RU of the wireless forwarding node and the upstream wireless node (e.g., in a multi-beam and/or multi-TRP configuration). Accordingly, to align transmissions in the uplink direction, an uplink transmit timing from the downstream wireless node to the wireless forwarding node may be aligned with an uplink transmit timing from the downstream wireless node to the upstream wireless node. In other words, the downstream wireless node may be configured with a single uplink transmit timing reference. In such cases, however, a propagation delay between the downstream wireless node and the wireless forwarding node may differ from a propagation delay between the downstream wireless node and the upstream wireless node. Accordingly, an uplink receive timing of the RU may be different from an uplink receive timing of the upstream wireless node, whereby the upstream wireless node may adjust the uplink transmit timing of the downstream wireless node (which determines the uplink receive timing of the RU) to account for the different propagation delays. Additionally, or alternatively, the downstream wireless node may be associated with a timing advance group (TAG) representing a group of cells for which the downstream wireless node can assume the same timing reference (e.g., for co-located cells associated with the same propagation delay). In such cases, where the downstream wireless node is served by the upstream wireless node and the RU of the wireless forwarding node and there are different propagation delays to the upstream wireless node and the RU of the wireless forwarding node, the upstream wireless node and the RU of the wireless forwarding node may be in different TAGs. In this way, the downstream wireless node may have different uplink transmit timing references with respect to the upstream wireless node and the RU of the wireless forwarding node that forwards uplink signals to the upstream wireless node.

In some aspects, the wireless forwarding node may be associated with a timing mode that is based at least in part on the wireless forwarding node supporting concurrent communications or enhanced duplexing. For example, in some aspects, the wireless forwarding node may support spatial division multiplexing for transmission (SDM-TX) enabling concurrent transmissions to the upstream wireless node and the downstream wireless node (e.g., using different beams and/or antenna arrays), spatial division multiplexing for reception (SDM-RX) enabling concurrent reception of communications from the upstream wireless node and the downstream wireless node, full-duplexing on a downlink (FD-DL) enabling concurrent reception from the upstream wireless node and transmission to the downstream wireless node, and/or full-duplexing on an uplink (FD-UL) enabling concurrent reception from the downstream wireless node and transmission to the upstream wireless node. In such cases, where the wireless forwarding node supports concurrent communications or enhanced duplexing, the wireless forwarding node may align the transmit and/or receive timing references of the concurrent communications to reduce interference between the concurrent communications. For example, the timing references of the concurrent communications may be aligned to be within a cyclic prefix length of one another, in order to maintain frequency domain orthogonality between concurrent communications that are frequency division multiplexed (FDMed). For example, an uplink transmit timing and a downlink transmit timing of the RU may be aligned in an SDM-TX mode, an uplink receive timing and a downlink receive timing of the RU may be aligned in an SDM-RX mode, a downlink receive timing and a downlink transmit timing of the RU may be aligned in an FD-DL mode, and/or an uplink receive timing and an uplink transmit timing of the RU may be aligned in an FD-UL mode.

Alternatively, in some aspects, the wireless forwarding node may be associated with a timing mode that is based at least in part on the wireless forwarding node operating in a time division multiplexing (TDM) mode, where the wireless forwarding node can only transmit or receive and can only communicate with one device in a particular time resource (e.g., in a particular symbol or slot). In this case, where different communications are time division multiplexed (TDMed) on adjacent time resources, a guard period is generally used to enable a switch between transmit and receive operations (or vice versa). For example, when forwarding a downlink communication, the wireless forwarding node may receive an incoming downlink signal from the upstream wireless node in a first symbol or slot, and may forward the downlink signal towards the downstream wireless node in a next symbol or slot. Accordingly, the guard period may be inserted between the first symbol or slot and the next symbol or slot to allow the wireless forwarding node to switch from receiving to transmitting. In this case, transmit and receive timing references of different communications that are TDMed may be aligned to reduce the guard period (e.g., a downlink or uplink receive time of the RU may be aligned with a downlink or uplink transmit time of the RU such that the RU may forward an incoming signal in a next symbol after the incoming signal is received). In this way, forwarding operations may be performed more efficiently by increasing the available time resources for the forwarding operations.

As indicated above, FIG. 9 is provided as an example. Other examples may differ from what is described with regard to FIG. 9.

Figure 10:
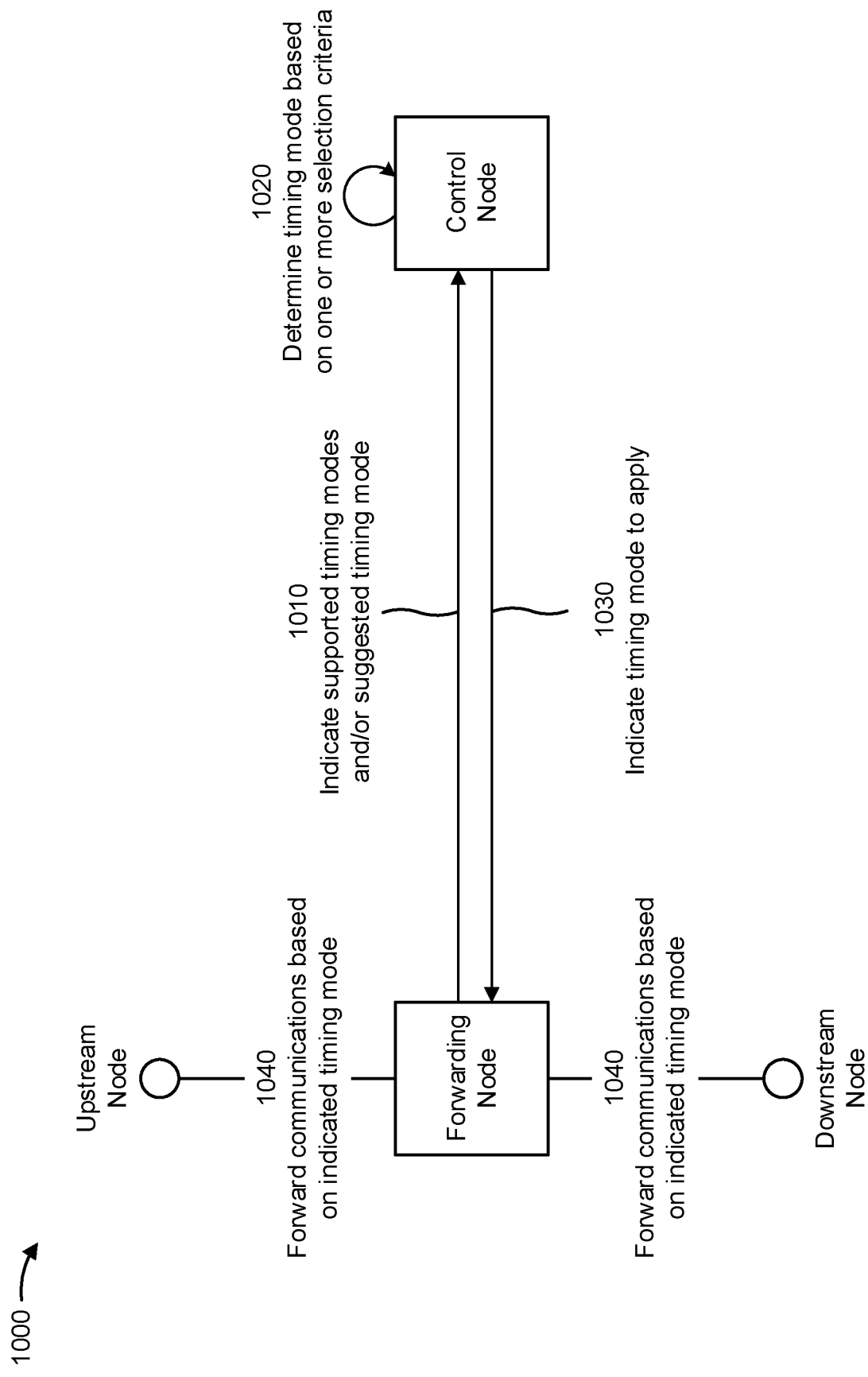

FIG. 10 is a diagram illustrating an example 1000 associated with timing management for wireless remote units, in accordance with the present disclosure. As shown in FIG. 10, example 1000 includes a forwarding node that may forward communications between an upstream node and a downstream node. In addition, as shown, example 1000 includes a control node that may control forwarding operations of the forwarding node. In some aspects, the control node and the upstream node may be the same node, or the control node may be different from the upstream node. In some aspects, the upstream node may correspond to a network node (e.g., a base station DU) and the downstream node may correspond to a UE, or the upstream node and the downstream node may be UEs communicating on a sidelink.

As shown in FIG. 10, and by reference number 1010, the forwarding node may transmit, to the control node, capability information indicating one or more timing modes that are supported by the forwarding node. For example, in some aspects, the capability information may indicate whether the forwarding node supports a timing mode in which downlink transmit timings are aligned among all network nodes, a timing node in which a downlink or uplink transmit time is based on a downlink or uplink receive time and a digital processing latency of the forwarding node (e.g., where the forwarding node supports an almost zero-delay forwarding), a timing mode in which transmit and/or receive timing references are aligned for concurrent communications in an SDM-TX, SDM-RX, FD-DL, and/or FD-UL enhanced duplexing mode, and/or a timing mode in which transmit and receive timing references are aligned to reduce a guard period between different communications that are TDMed on adjacent time resources. Furthermore, in some aspects, the forwarding node may transmit, to the control node, information indicating a suggested or preferred timing mode (e.g., in cases where the forwarding node supports multiple timing modes, depending on a configuration of the forwarding node, and/or the like).

As further shown in FIG. 10, and by reference number 1020, the control node may determine a timing mode to be applied at the forwarding node based on one or more selection criteria. For example, in some aspects, the control node may determine the timing mode to be applied at the forwarding node based on the timing mode(s) that the forwarding node supports and/or the suggested or preferred timing mode indicated by the forwarding node. Additionally, or alternatively, the one or more selection criteria that the control node uses to determine the timing mode to be applied at the forwarding node may include a type associated with the forwarding node (e.g., whether the forwarding node is implemented as a repeater unit or a relay unit, a split option implemented by the forwarding node, and/or the like), a digital processing latency of the forwarding node (e.g., based on the split option implemented by the forwarding node), a service status of the downstream node served by the forwarding node (e.g., whether the downstream node is being served only by the forwarding node, by both the forwarding node and the upstream node for both an uplink and a downlink in multi-beam and/or multi-TRP operation, and/or by the forwarding node only for an uplink or only for a downlink), and/or a number of downstream nodes that the forwarding node is serving on an uplink and/or a downlink (e.g., whether the forwarding node is serving one or multiple downstream nodes).

As further shown in FIG. 10, and by reference number 1030, the control node may transmit, to the forwarding node, information indicating the timing mode to be applied at the forwarding node. For example, the control node may generally indicate whether the forwarding node is to align a downlink transmit timing with a downlink transmit timing of the upstream node, align a downlink or uplink transmit time with a downlink or uplink receive time plus a digital processing latency of the forwarding node, align transmit and/or receive timing references for concurrent communications in an enhanced duplexing mode, and/or align transmit and receive timing references for TDMed communications on adjacent time resources. In some aspects, the timing mode may be semi-statically indicated in RRC signaling and/or dynamically indicated in downlink control information (DCI) or a medium access control (MAC) control element (MAC-CE). Furthermore, in some aspects, the indicated timing mode may be specific to the particular downstream node (e.g., a particular UE), specific to a particular beam used to communicate with the upstream node and/or the downstream node, specific to a particular duplexing mode (e.g., SDM-Tx, SDM-Rx, FD-DL, FD-UL, TDM, and/or the like), specific to a particular resource (e.g., a particular time resource, such as a symbol or a slot, a particular frequency resource, such as a bandwidth part or frequency band, and/or the like), specific to a particular signal (e.g., a reference signal, a control signal, a data signal, and/or the like), and/or specific to a particular physical channel (e.g., a control channel, such as a PDCCH, PUCCH, and/or physical sidelink control channel (PSCCH), a data channel, such as a PDSCH, PUSCH, and/or physical sidelink shared channel (PSSCH), an uplink channel, a downlink channel, and/or the like). Accordingly, as further shown in FIG. 10, and by reference number 1040, the forwarding node may then set one or more timing references to forward communications between the upstream node and the downstream node based on the timing mode indicated by the control node.

As indicated above, FIG. 10 is provided as an example. Other examples may differ from what is described with regard to FIG. 10.

Figure 11:
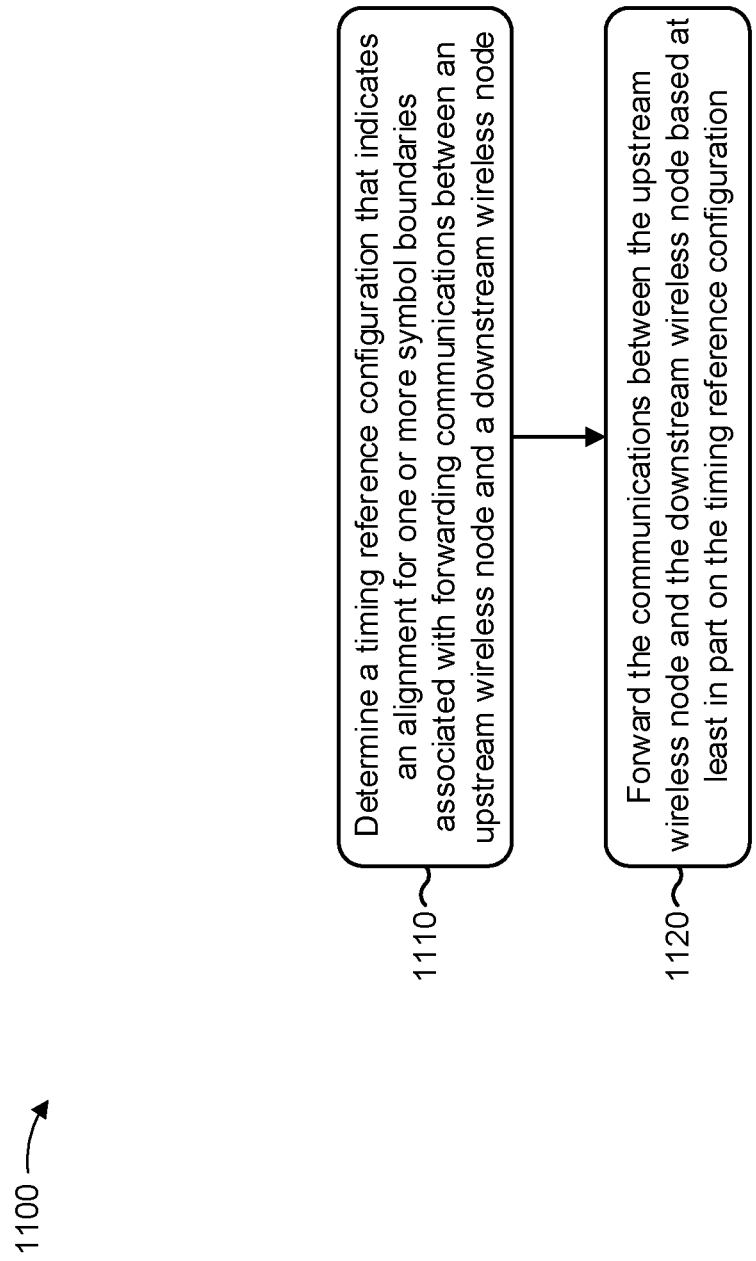
FIGS. 11-12 are diagrams illustrating example processes associated with timing management for wireless remote units, in accordance with the present disclosure.

FIG. 11 is a diagram illustrating an example process 1100 performed, for example, by a wireless forwarding node, in accordance with the present disclosure. Example process 1100 is an example where the wireless forwarding node (e.g., forwarding node 310, forwarding node 405, and/or the like) performs operations associated with timing management for wireless remote units.

As shown in FIG. 11, in some aspects, process 1100 may include determining a timing reference configuration that indicates an alignment for one or more symbol boundaries associated with forwarding communications between an upstream wireless node and a downstream wireless node (block 1110). For example, the wireless forwarding node (e.g., using determination component 1308, depicted in FIG. 13) may determine a timing reference configuration that indicates an alignment for one or more symbol boundaries associated with forwarding communications between an upstream wireless node and a downstream wireless node, as described above.

As further shown in FIG. 11, in some aspects, process 1100 may include forwarding the communications between the upstream wireless node and the downstream wireless node based at least in part on the timing reference configuration (block 1120). For example, the wireless forwarding node (e.g., using reception component 1302 and/or transmission component 1304, depicted in FIG. 13) may forward the communications between the upstream wireless node and the downstream wireless node based at least in part on the timing reference configuration, as described above.

Process 1100 may include additional aspects, such as any single aspect or any combination of aspects described below and/or in connection with one or more other processes described elsewhere herein.

In a first aspect, the timing reference configuration indicates a downlink transmit timing that is aligned with a downlink transmit timing associated with the upstream wireless node.

In a second aspect, alone or in combination with the first aspect, the timing reference configuration indicates an uplink receive timing that has an offset with respect to a downlink transmit timing.

In a third aspect, alone or in combination with one or more of the first and second aspects, the offset is based at least in part on a propagation delay between the wireless forwarding node and one or more of the upstream wireless node or the downstream wireless node, or a switching time requirement of the wireless forwarding node and one or more of the upstream wireless node or the downstream wireless node.

In a fourth aspect, alone or in combination with one or more of the first through third aspects, the timing reference configuration indicates an alignment between a downlink transmit timing and a downlink receive timing that is based at least in part on a digital processing latency associated with a downlink signal to be forwarded from the upstream wireless node to the downstream wireless node.

In a fifth aspect, alone or in combination with one or more of the first through fourth aspects, the timing reference configuration indicates an advance to a downlink transmit timing associated with the upstream wireless node that is based at least in part on the digital processing latency.

In a sixth aspect, alone or in combination with one or more of the first through fifth aspects, the timing reference configuration indicates an alignment between an uplink transmit timing and an uplink receive timing that is based at least in part on a digital processing latency associated with an uplink signal to be forwarded from the downstream wireless node to the upstream wireless node.

In a seventh aspect, alone or in combination with one or more of the first through sixth aspects, the timing reference configuration further indicates an advance to an uplink transmit timing associated with the downstream wireless node that is based at least in part on the digital processing latency.

In an eighth aspect, alone or in combination with one or more of the first through seventh aspects, the timing reference configuration indicates an uplink transmit timing from the downstream wireless node to the wireless forwarding node.

In a ninth aspect, alone or in combination with one or more of the first through eighth aspects, the uplink transmit timing from the downstream wireless node to the wireless forwarding node is aligned with or different from an uplink transmit timing from the downstream wireless node to the upstream wireless node.

In a tenth aspect, alone or in combination with one or more of the first through ninth aspects, the timing reference configuration indicates an alignment between a first transmit or receive timing and a second transmit or receive timing that are associated with concurrent communications in one or more of a spatial division multiplexing mode or a full-duplex communication mode.

In an eleventh aspect, alone or in combination with one or more of the first through tenth aspects, the timing reference configuration indicates an alignment between a downlink or uplink transmit timing and a downlink or uplink receive timing associated with different communications that are TDMed on adjacent time resources.

In a twelfth aspect, alone or in combination with one or more of the first through eleventh aspects, the alignment between the downlink or uplink transmit timing and the downlink or uplink receive timing reduces a guard period between the different communications that are TDMed on the adjacent time resources.

In a thirteenth aspect, alone or in combination with one or more of the first through twelfth aspects, process 1100 includes receiving, from a control node, information indicating the timing reference configuration associated with forwarding the communications between the upstream wireless node and the downstream wireless node.

In a fourteenth aspect, alone or in combination with one or more of the first through thirteenth aspects, the timing reference configuration indicated by the control node is specific to one or more of the downstream wireless node, a beam, a duplexing mode, a resource, a signal, or a physical channel.

In a fifteenth aspect, alone or in combination with one or more of the first through fourteenth aspects, the timing reference configuration indicated by the control node is based at least in part on one or more of a type or a split option associated with the wireless forwarding node, a digital processing latency associated with the wireless forwarding node, a service status associated with the downstream wireless node, or a number of downstream wireless nodes served by the wireless forwarding node.

In a sixteenth aspect, alone or in combination with one or more of the first through fifteenth aspects, the timing reference configuration is dynamically indicated by the control node in DCI or a MAC-CE, or semi-statically indicated by the control node in RRC signaling.

In a seventeenth aspect, alone or in combination with one or more of the first through sixteenth aspects, process 1100 includes transmitting, to the control node, capability information indicating one or more of a set of timing reference configurations supported by the wireless forwarding node, or a suggested timing reference configuration to be used for forwarding the communications between the upstream wireless node and the downstream wireless node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
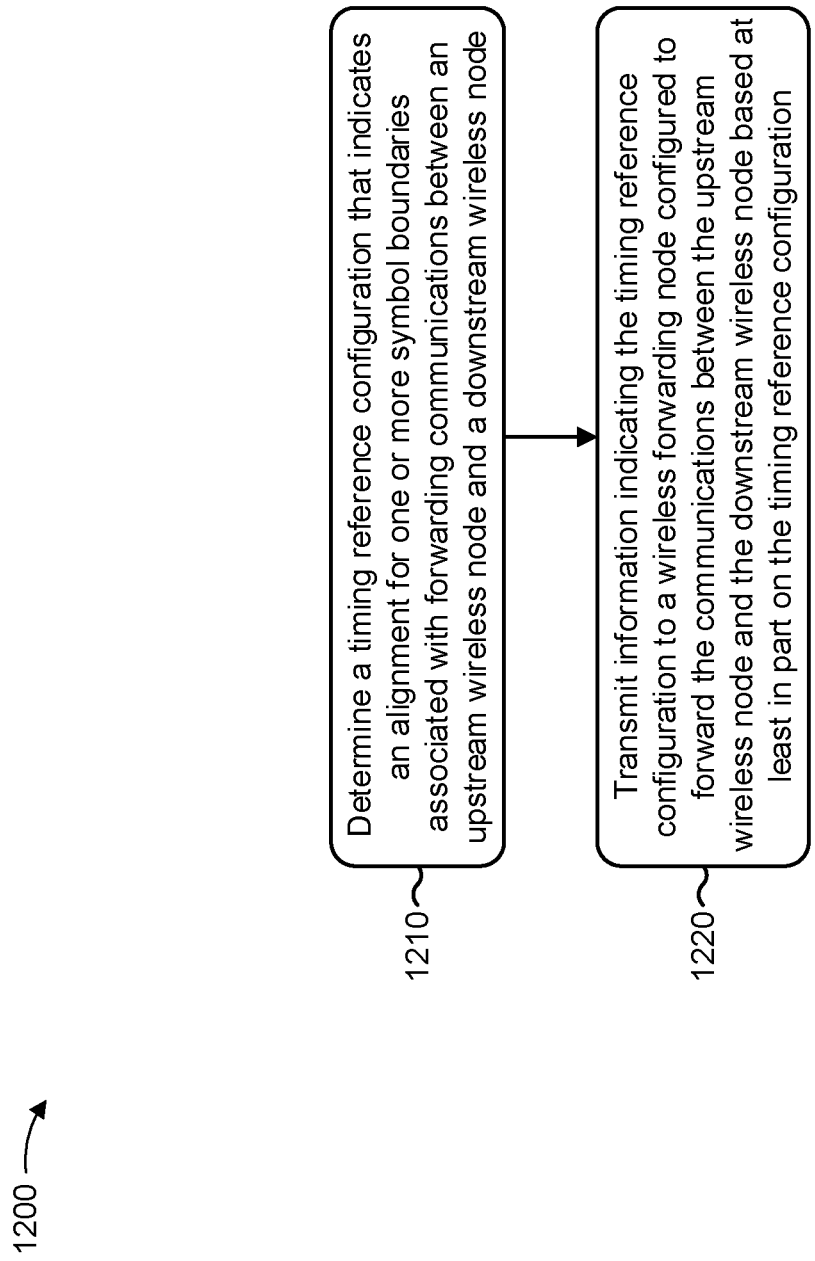

FIG. 12 is a diagram illustrating an example process 1200 performed, for example, by a control node, in accordance with the present disclosure. Example process 1200 is an example where the control node (e.g., control node 410 and/or the like) performs operations associated with timing management for wireless remote units.

As shown in FIG. 12, in some aspects, process 1200 may include determining a timing reference configuration that indicates an alignment for one or more symbol boundaries associated with forwarding communications between an upstream wireless node and a downstream wireless node (block 1210). For example, the control node (e.g., using determination component 1408, depicted in FIG. 14) may determine a timing reference configuration that indicates an alignment for one or more symbol boundaries associated with forwarding communications between an upstream wireless node and a downstream wireless node, as described above.

As further shown in FIG. 12, in some aspects, process 1200 may include transmitting information indicating the timing reference configuration to a wireless forwarding node configured to forward the communications between the upstream wireless node and the downstream wireless node based at least in part on the timing reference configuration (block 1220). For example, the control node (e.g., using transmission component 1404, depicted in FIG. 14) may transmit information indicating the timing reference configuration to a wireless forwarding node configured to forward the communications between the upstream wireless node and the downstream wireless node based at least in part on the timing reference configuration, as described above.

Process 1200 may include additional aspects, such as any single aspect or any combination of aspects described below and/or in connection with one or more other processes described elsewhere herein.

In a first aspect, the timing reference configuration indicates a downlink transmit timing that is aligned with a downlink transmit timing associated with the upstream wireless node.

In a second aspect, alone or in combination with the first aspect, the timing reference configuration indicates an uplink receive timing that has an offset with respect to a downlink transmit timing.

In a third aspect, alone or in combination with one or more of the first and second aspects, the offset is based at least in part on a propagation delay between the wireless forwarding node and one or more of the upstream wireless node or the downstream wireless node, or a switching time requirement of the wireless forwarding node and one or more of the upstream wireless node or the downstream wireless node.

In a fourth aspect, alone or in combination with one or more of the first through third aspects, the timing reference configuration indicates an alignment between a downlink transmit timing and a downlink receive timing that is based at least in part on a digital processing latency associated with a downlink signal to be forwarded from the upstream wireless node to the downstream wireless node.

In a fifth aspect, alone or in combination with one or more of the first through fourth aspects, the timing reference configuration indicates an advance to a downlink transmit timing associated with the upstream wireless node that is based at least in part on the digital processing latency.

In a sixth aspect, alone or in combination with one or more of the first through fifth aspects, the timing reference configuration indicates an alignment between an uplink transmit timing and an uplink receive timing that is based at least in part on a digital processing latency associated with an uplink signal to be forwarded from the downstream wireless node to the upstream wireless node.

In a seventh aspect, alone or in combination with one or more of the first through sixth aspects, the timing reference configuration further indicates an advance to an uplink transmit timing associated with the downstream wireless node that is based at least in part on the digital processing latency.

In an eighth aspect, alone or in combination with one or more of the first through seventh aspects, the timing reference configuration indicates an uplink transmit timing from the downstream wireless node to the wireless forwarding node.

In a ninth aspect, alone or in combination with one or more of the first through eighth aspects, the uplink transmit timing from the downstream wireless node to the wireless forwarding node is aligned with or different from an uplink transmit timing from the downstream wireless node to the upstream wireless node.

In a tenth aspect, alone or in combination with one or more of the first through ninth aspects, the timing reference configuration indicates an alignment between a first transmit or receive timing and a second transmit or receive timing that are associated with concurrent communications in one or more of a spatial division multiplexing mode or a full-duplex communication mode.

In an eleventh aspect, alone or in combination with one or more of the first through tenth aspects, the timing reference configuration indicates an alignment between a downlink or uplink transmit timing and a downlink or uplink receive timing associated with different communications that are TDMed on adjacent time resources.

In a twelfth aspect, alone or in combination with one or more of the first through eleventh aspects, the alignment between the downlink or uplink transmit timing and the downlink or uplink receive timing reduces a guard period between the different communications that are TDMed on the adjacent time resources.

In a thirteenth aspect, alone or in combination with one or more of the first through twelfth aspects, the timing reference configuration is specific to one or more of the downstream wireless node, a beam, a duplexing mode, a resource, a signal, or a physical channel.

In a fourteenth aspect, alone or in combination with one or more of the first through thirteenth aspects, the timing reference configuration is based at least in part on one or more of a type or a split option associated with the wireless forwarding node, a digital processing latency associated with the wireless forwarding node, a service status associated with the downstream wireless node, or a number of downstream wireless nodes served by the wireless forwarding node.

In a fifteenth aspect, alone or in combination with one or more of the first through fourteenth aspects, the timing reference configuration is dynamically indicated in DCI or a MAC-CE, or semi-statically indicated in RRC signaling.

In a sixteenth aspect, alone or in combination with one or more of the first through fifteenth aspects, process 1200 includes receiving, from the wireless forwarding node, capability information indicating one or more of a set of timing reference configurations supported by the wireless forwarding node, or a suggested timing reference configuration to be used for forwarding the communications between the upstream wireless node and the downstream wireless node.

In a seventeenth aspect, alone or in combination with one or more of the first through sixteenth aspects, the timing reference configuration is determined based at least in part on one or more of the capability information or the suggested timing reference configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
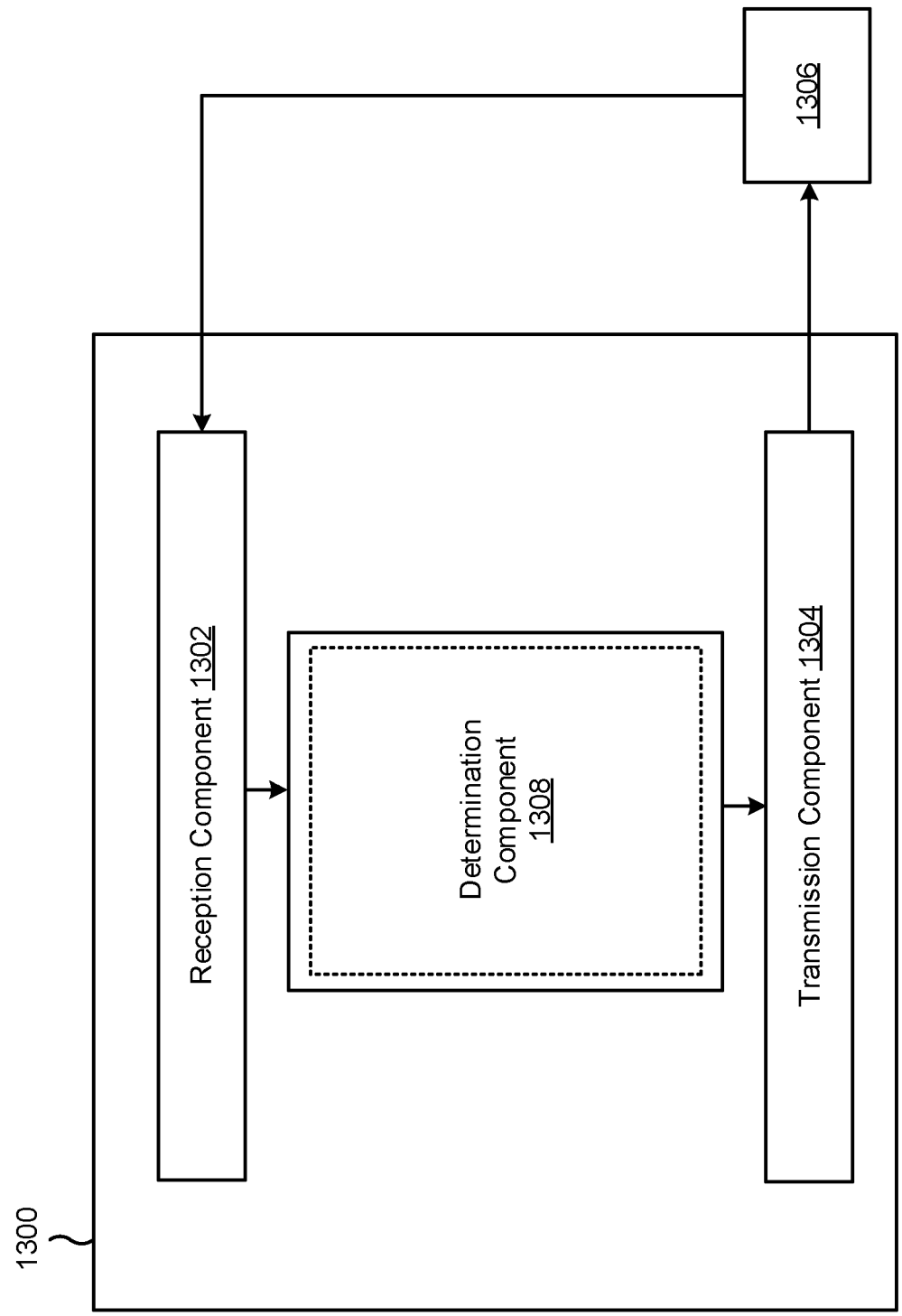
FIGS. 13-14 are block diagrams of example apparatuses for wireless communication, in accordance with the present disclosure.

FIG. 13 is a block diagram of an example apparatus 1300 for wireless communication. The apparatus 1300 may be a wireless forwarding node, such as a repeater node and/or a relay node, or a wireless forwarding node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, a control node, or another wireless communication device) using the reception component 1302 and the transmission component 1304. As further shown, the apparatus 1300 may include a determination component 1308, among other examples.

In some aspects, the apparatus 1300 may be configured to perform one or more operations described herein in connection with FIGS. 8-10. Additionally or alternatively, the apparatus 1300 may be configured to perform one or more processes described herein, such as process 1100 of FIG. 11. In some aspects, the apparatus 1300 and/or one or more components shown in FIG. 13 may include one or more components of the UE and/or the base station described above in connection with FIG. 2. Additionally, or alternatively, one or more components shown in FIG. 13 may be implemented within one or more components described above in connection with FIG. 2, FIG. 4, FIG. 5, FIG. 6A, and/or FIG. 6B. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, an Rx chain, or a combination thereof, of the UE, the base station, and/or the forwarding node described above in connection with FIG. 2, FIG. 3, FIG. 4, FIG. 5, FIG. 6A, and/or FIG. 6B.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, a Tx chain, or a combination thereof, of the UE, the base station, and/or the forwarding node described above in connection with FIG. 2, FIG. 3, FIG. 4, FIG. 5, FIG. 6A, and/or FIG. 6B. In some aspects, the transmission component 1304 may be co-located with the reception component 1302 in a transceiver.

The determination component 1308 may determine a timing reference configuration that indicates an alignment for one or more symbol boundaries associated with forwarding communications between an upstream wireless node and a downstream wireless node. In some aspects, the determination component 1308 may include one or more antennas, a demodulator, a MIMO detector, a receive processor, a modulator, a transmit MIMO processor, a transmit processor, a controller/processor, a memory, or a combination thereof, of the UE, the base station, and/or the forwarding node described above in connection with FIG. 2, FIG. 3, FIG. 4, FIG. 5, FIG. 6A, and/or FIG. 6B. The reception component 1302 and/or the transmission component 1304 may forward the communications between the upstream wireless node and the downstream wireless node based at least in part on the timing reference configuration.

The reception component 1302 may receive, from a control node, information indicating the timing reference configuration associated with forwarding the communications between the upstream wireless node and the downstream wireless node.

The transmission component 1304 may transmit, to the control node, capability information indicating a set of timing reference configurations supported by the wireless forwarding node and/or a suggested timing reference configuration to be used for forwarding the communications between the upstream wireless node and the downstream wireless node.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
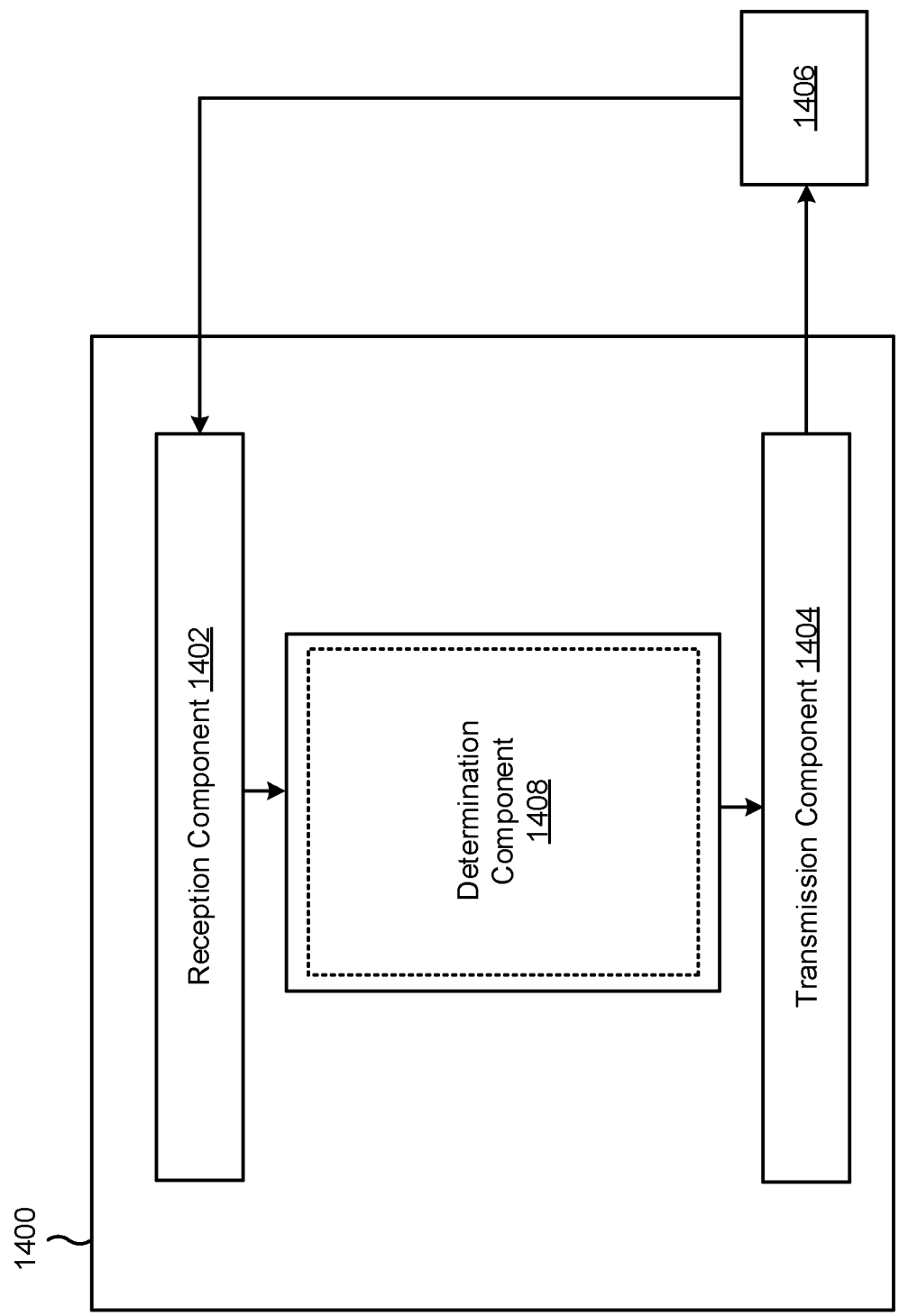

FIG. 14 is a block diagram of an example apparatus 1400 for wireless communication. The apparatus 1400 may be a control node, or a control node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, a wireless forwarding node, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 8-10. Additionally or alternatively, the apparatus 1400 may be configured to perform one or more processes described herein, such as process 1200 of FIG. 12 or a combination thereof. In some aspects, the apparatus 1400 and/or one or more components shown in FIG. 14 may include one or more components of the base station and/or network controller described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, a communication unit, or a combination thereof, of the base station, the network controller, and/or the control node described above in connection with FIG. 2 and/or FIG. 4.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, a communication unit, or a combination thereof, of the base station, the network controller, and/or the control node described above in connection with FIG. 2 and/or FIG. 4. In some aspects, the transmission component 1404 may be co-located with the reception component 1402 in a transceiver.

The determination component 1408 may determine a timing reference configuration that indicates an alignment for one or more symbol boundaries associated with forwarding communications between an upstream wireless node and a downstream wireless node. In some aspects, the determination component 1408 may include one or more antennas, a demodulator, a MIMO detector, a receive processor, a modulator, a transmit MIMO processor, a transmit processor, a controller/processor, a memory, or a combination thereof, of the base station, the network controller, and/or the control node described above in connection with FIG. 2 and/or FIG. 4. The transmission component 1404 may transmit information indicating the timing reference configuration to a wireless forwarding node configured to forward the communications between the upstream wireless node and the downstream wireless node based at least in part on the timing reference configuration.

The reception component 1402 may receive, from the wireless forwarding node, capability information indicating a set of timing reference configurations supported by the wireless forwarding node and/or or a suggested timing reference configuration to be used for forwarding the communications between the upstream wireless node and the downstream wireless node.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a wireless forwarding node, comprising: determining a timing reference configuration that indicates an alignment for one or more symbol boundaries associated with forwarding communications between an upstream wireless node and a downstream wireless node; and forwarding the communications between the upstream wireless node and the downstream wireless node based at least in part on the timing reference configuration.

Aspect 2: The method of Aspect 1, wherein the timing reference configuration indicates a downlink transmit timing that is aligned with a downlink transmit timing associated with the upstream wireless node.

Aspect 3: The method of any of Aspects 1-2, wherein the timing reference configuration indicates an uplink receive timing that has an offset with respect to a downlink transmit timing.

Aspect 4: The method of Aspect 3, wherein the offset is based at least in part on a propagation delay between the wireless forwarding node and one or more of the upstream wireless node or the downstream wireless node, or a switching time requirement of the wireless forwarding node and one or more of the upstream wireless node or the downstream wireless node.

Aspect 5: The method of any of Aspects 1-4, wherein the timing reference configuration indicates an alignment between a downlink transmit timing and a downlink receive timing that is based at least in part on a digital processing latency associated with a downlink signal to be forwarded from the upstream wireless node to the downstream wireless node.

Aspect 6: The method of Aspect 5, wherein the timing reference configuration indicates an advance to a downlink transmit timing associated with the upstream wireless node that is based at least in part on the digital processing latency.

Aspect 7: The method of any of Aspects 1-6, wherein the timing reference configuration indicates an alignment between an uplink transmit timing and an uplink receive timing that is based at least in part on a digital processing latency associated with an uplink signal to be forwarded from the downstream wireless node to the upstream wireless node.

Aspect 8: The method of Aspect 7, wherein the timing reference configuration further indicates an advance to an uplink transmit timing associated with the downstream wireless node that is based at least in part on the digital processing latency.

Aspect 9: The method of any of Aspects 1-8, wherein the timing reference configuration indicates an uplink transmit timing from the downstream wireless node to the wireless forwarding node.

Aspect 10: The method of Aspect 9, wherein the uplink transmit timing from the downstream wireless node to the wireless forwarding node is aligned with or different from an uplink transmit timing from the downstream wireless node to the upstream wireless node.

Aspect 11: The method of any of Aspects 1-10, wherein the timing reference configuration indicates an alignment between a first transmit or receive timing and a second transmit or receive timing that are associated with concurrent communications in one or more of a spatial division multiplexing mode or a full-duplex communication mode.

Aspect 12: The method of any of Aspects 1-11, wherein the timing reference configuration indicates an alignment between a downlink or uplink transmit timing and a downlink or uplink receive timing associated with different communications that are TDMed on adjacent time resources.

Aspect 13: The method of Aspect 12, wherein the alignment between the downlink or uplink transmit timing and the downlink or uplink receive timing reduces a guard period between the different communications that are TDMed on the adjacent time resources.

Aspect 14: The method of any of Aspects 1-13, further comprising: receiving, from a control node, information indicating the timing reference configuration associated with forwarding the communications between the upstream wireless node and the downstream wireless node.

Aspect 15: The method of Aspect 14, wherein the timing reference configuration indicated by the control node is specific to one or more of: the downstream wireless node, a beam, a duplexing mode, a resource, a signal, or a physical channel.

Aspect 16: The method of any of Aspects 14-15, wherein the timing reference configuration indicated by the control node is based at least in part on one or more of: a type or a split option associated with the wireless forwarding node, a digital processing latency associated with the wireless forwarding node, a service status associated with the downstream wireless node, or a number of downstream wireless nodes served by the wireless forwarding node.

Aspect 17: The method of any of Aspects 14-16, wherein the timing reference configuration is dynamically indicated by the control node in downlink control information or a medium access control element, or semi-statically indicated by the control node in radio resource control signaling.

Aspect 18: The method of any of Aspects 14-17, further comprising: transmitting, to the control node, capability information indicating one or more of: a set of timing reference configurations supported by the wireless forwarding node, or a suggested timing reference configuration to be used for forwarding the communications between the upstream wireless node and the downstream wireless node.

Aspect 19: A method of wireless communication performed by a control node, comprising: determining a timing reference configuration that indicates an alignment for one or more symbol boundaries associated with forwarding communications between an upstream wireless node and a downstream wireless node; and transmitting information indicating the timing reference configuration to a wireless forwarding node configured to forward the communications between the upstream wireless node and the downstream wireless node based at least in part on the timing reference configuration.

Aspect 20: The method of Aspect 19, wherein the timing reference configuration indicates a downlink transmit timing that is aligned with a downlink transmit timing associated with the upstream wireless node.

Aspect 21: The method of any of Aspects 19-20, wherein the timing reference configuration indicates an uplink receive timing that has an offset with respect to a downlink transmit timing.

Aspect 22: The method of Aspect 21, wherein the offset is based at least in part on a propagation delay between the wireless forwarding node and one or more of the upstream wireless node or the downstream wireless node, or a switching time requirement of the wireless forwarding node and one or more of the upstream wireless node or the downstream wireless node.

Aspect 23: The method of any of Aspects 19-22, wherein the timing reference configuration indicates an alignment between a downlink transmit timing and a downlink receive timing that is based at least in part on a digital processing latency associated with a downlink signal to be forwarded from the upstream wireless node to the downstream wireless node.

Aspect 24: The method of Aspect 23, wherein the timing reference configuration indicates an advance to a downlink transmit timing associated with the upstream wireless node that is based at least in part on the digital processing latency.

Aspect 25: The method of any of Aspects 19-24, wherein the timing reference configuration indicates an alignment between an uplink transmit timing and an uplink receive timing that is based at least in part on a digital processing latency associated with an uplink signal to be forwarded from the downstream wireless node to the upstream wireless node.

Aspect 26: The method of Aspect 25, wherein the timing reference configuration further indicates an advance to an uplink transmit timing associated with the downstream wireless node that is based at least in part on the digital processing latency.

Aspect 27: The method of any of Aspects 19-26, wherein the timing reference configuration indicates an uplink transmit timing from the downstream wireless node to the wireless forwarding node.

Aspect 28: The method of Aspect 27, wherein the uplink transmit timing from the downstream wireless node to the wireless forwarding node is aligned with or different from an uplink transmit timing from the downstream wireless node to the upstream wireless node.

Aspect 29: The method of any of Aspects 19-28, wherein the timing reference configuration indicates an alignment between a first transmit or receive timing and a second transmit or receive timing that are associated with concurrent communications in one or more of a spatial division multiplexing mode or a full-duplex communication mode.

Aspect 30: The method of any of Aspects 19-29, wherein the timing reference configuration indicates an alignment between a downlink or uplink transmit timing and a downlink or uplink receive timing associated with different communications that are TDMed on adjacent time resources.

Aspect 31: The method of Aspect 30, wherein the alignment between the downlink or uplink transmit timing and the downlink or uplink receive timing reduces a guard period between the different communications that are TDMed on the adjacent time resources.

Aspect 32: The method of any of Aspects 19-31, wherein the timing reference configuration is specific to one or more of: the downstream wireless node, a beam, a duplexing mode, a resource, a signal, or a physical channel.

Aspect 33: The method of any of Aspects 19-32, wherein the timing reference configuration is based at least in part on one or more of: a type or a split option associated with the wireless forwarding node, a digital processing latency associated with the wireless forwarding node, a service status associated with the downstream wireless node, or a number of downstream wireless nodes served by the wireless forwarding node.

Aspect 34: The method of any of Aspects 19-33, wherein the timing reference configuration is dynamically indicated in downlink control information or a medium access control element, or semi-statically indicated in radio resource control signaling.

Aspect 35: The method of any of Aspects 19-34, further comprising: receiving, from the wireless forwarding node, capability information indicating one or more of: a set of timing reference configurations supported by the wireless forwarding node, or a suggested timing reference configuration to be used for forwarding the communications between the upstream wireless node and the downstream wireless node.

Aspect 36: The method of Aspect 35, wherein the timing reference configuration is determined based at least in part on one or more of the capability information or the suggested timing reference configuration.

Aspect 37: An apparatus for wireless communication at a device, comprising a processor; memory coupled with the processor; and instructions stored in the memory and executable by the processor to cause the apparatus to perform the method of one or more of Aspects 1-18.

Aspect 38: A device for wireless communication, comprising a memory and one or more processors coupled to the memory, the one or more processors configured to perform the method of one or more of Aspects 1-18.

Aspect 39: An apparatus for wireless communication, comprising at least one means for performing the method of one or more of Aspects 1-18.

Aspect 40: A non-transitory computer-readable medium storing code for wireless communication, the code comprising instructions executable by a processor to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: An apparatus for wireless communication at a device, comprising a processor; memory coupled with the processor; and instructions stored in the memory and executable by the processor to cause the apparatus to perform the method of one or more of Aspects 19-36.

Aspect 43: A device for wireless communication, comprising a memory and one or more processors coupled to the memory, the one or more processors configured to perform the method of one or more of Aspects 19-36.

Aspect 44: An apparatus for wireless communication, comprising at least one means for performing the method of one or more of Aspects 19-36.

Aspect 45: A non-transitory computer-readable medium storing code for wireless communication, the code comprising instructions executable by a processor to perform the method of one or more of Aspects 19-36.

Aspect 46: A non-transitory computer-readable medium storing a set of instructions for wireless communication, the set of instructions comprising one or more instructions that, when executed by one or more processors of a device, cause the device to perform the method of one or more of Aspects 19-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless forwarding node, comprising:
    determining a timing reference configuration that indicates an alignment for one or more symbol boundaries associated with forwarding communications between an upstream wireless node and a downstream wireless node; and
    forwarding the communications between the upstream wireless node and the downstream wireless node based at least in part on the timing reference configuration.

2. The method of claim 1, wherein the timing reference configuration indicates a downlink transmit timing that is aligned with a downlink transmit timing associated with the upstream wireless node.

3. The method of claim 1, wherein the timing reference configuration indicates an uplink receive timing that has an offset with respect to a downlink transmit timing.

4. The method of claim 3, wherein the offset is based at least in part on a propagation delay between the wireless forwarding node and one or more of the upstream wireless node or the downstream wireless node, or a switching time requirement of the wireless forwarding node and one or more of the upstream wireless node or the downstream wireless node.

5. The method of claim 1, wherein the timing reference configuration indicates an alignment between a downlink transmit timing and a downlink receive timing that is based at least in part on a digital processing latency associated with a downlink signal to be forwarded from the upstream wireless node to the downstream wireless node.

6. The method of claim 5, wherein the timing reference configuration indicates an advance to a downlink transmit timing associated with the upstream wireless node that is based at least in part on the digital processing latency.

7. The method of claim 1, wherein the timing reference configuration indicates an alignment between an uplink transmit timing and an uplink receive timing that is based at least in part on a digital processing latency associated with an uplink signal to be forwarded from the downstream wireless node to the upstream wireless node.

8. The method of claim 7, wherein the timing reference configuration further indicates an advance to an uplink transmit timing associated with the downstream wireless node that is based at least in part on the digital processing latency.

9. The method of claim 1, wherein the timing reference configuration indicates an uplink transmit timing from the downstream wireless node to the wireless forwarding node.

10. The method of claim 1, wherein the timing reference configuration indicates an alignment between a first transmit or receive timing and a second transmit or receive timing that are associated with concurrent communications in one or more of a spatial division multiplexing mode or a full-duplex communication mode.

11. The method of claim 1, wherein the timing reference configuration indicates an alignment between a downlink or uplink transmit timing and a downlink or uplink receive timing associated with different communications that are time division multiplexed (TDMed) on adjacent time resources.

12. The method of claim 11, wherein the alignment between the downlink or uplink transmit timing and the downlink or uplink receive timing reduces a guard period between the different communications that are TDMed on the adjacent time resources.

13. The method of claim 1, further comprising:
    receiving, from a control node, information indicating the timing reference configuration associated with forwarding the communications between the upstream wireless node and the downstream wireless node, wherein the timing reference configuration indicated by the control node is based at least in part on one or more of: a type or a split option associated with the wireless forwarding node, a digital processing latency associated with the wireless forwarding node, a service status associated with the downstream wireless node, or a number of downstream wireless nodes served by the wireless forwarding node.

14. The method of claim 13, further comprising:
    transmitting, to the control node, capability information indicating one or more of: a set of timing reference configurations supported by the wireless forwarding node, or a suggested timing reference configuration to be used for forwarding the communications between the upstream wireless node and the downstream wireless node.

15. A method of wireless communication performed by a control node, comprising:
    determining a timing reference configuration that indicates an alignment for one or more symbol boundaries associated with forwarding communications between an upstream wireless node and a downstream wireless node; and transmitting information indicating the timing reference configuration to a wireless forwarding node configured to forward the communications between the upstream wireless node and the downstream wireless node based at least in part on the timing reference configuration.

16. The method of claim 15, wherein the timing reference configuration indicates a downlink transmit timing that is aligned with a downlink transmit timing associated with the upstream wireless node.

17. The method of claim 15, wherein the timing reference configuration indicates an uplink receive timing that has an offset with respect to a downlink transmit timing.

18. The method of claim 17, wherein the offset is based at least in part on a propagation delay between the wireless forwarding node and one or more of the upstream wireless node or the downstream wireless node, or a switching time requirement of the wireless forwarding node and one or more of the upstream wireless node or the downstream wireless node.

19. The method of claim 15, wherein the timing reference configuration indicates an alignment between a downlink transmit timing and a downlink receive timing that is based at least in part on a digital processing latency associated with a downlink signal to be forwarded from the upstream wireless node to the downstream wireless node.

20. The method of claim 19, wherein the timing reference configuration indicates an advance to a downlink transmit timing associated with the upstream wireless node that is based at least in part on the digital processing latency.

21. The method of claim 15, wherein the timing reference configuration indicates an alignment between an uplink transmit timing and an uplink receive timing that is based at least in part on a digital processing latency associated with an uplink signal to be forwarded from the downstream wireless node to the upstream wireless node.

22. The method of claim 21, wherein the timing reference configuration further indicates an advance to an uplink transmit timing associated with the downstream wireless node that is based at least in part on the digital processing latency.

23. The method of claim 15, wherein the timing reference configuration indicates an uplink transmit timing from the downstream wireless node to the wireless forwarding node.

24. The method of claim 15, wherein the timing reference configuration indicates an alignment between a first transmit or receive timing and a second transmit or receive timing that are associated with concurrent communications in one or more of a spatial division multiplexing mode or a full-duplex communication mode.

25. The method of claim 15, wherein the timing reference configuration indicates an alignment between a downlink or uplink transmit timing and a downlink or uplink receive timing associated with different communications that are time division multiplexed (TDMed) on adjacent time resources.

26. The method of claim 25, wherein the alignment between the downlink or uplink transmit timing and the downlink or uplink receive timing reduces a guard period between the different communications that are TDMed on the adjacent time resources.

27. The method of claim 15, wherein the timing reference configuration is based at least in part on one or more of: a type or a split option associated with the wireless forwarding node, a digital processing latency associated with the wireless forwarding node, a service status associated with the downstream wireless node, or a number of downstream wireless nodes served by the wireless forwarding node.

28. The method of claim 15, further comprising:
receiving, from the wireless forwarding node, capability information indicating one or more of: a set of timing reference configurations supported by the wireless forwarding node, or a suggested timing reference configuration to be used for forwarding the communications between the upstream wireless node and the downstream wireless node, wherein the timing reference configuration is determined based at least in part on one or more of the capability information or the suggested timing reference configuration.

29. A wireless forwarding node for wireless communication, comprising:
a memory; and
one or more processors, coupled to the memory, configured to:
determine a timing reference configuration that indicates an alignment for one or more symbol boundaries associated with forwarding communications between an upstream wireless node and a downstream wireless node; and
forward the communications between the upstream wireless node and the downstream wireless node based at least in part on the timing reference configuration.

30. A control node for wireless communication, comprising:
a memory; and
one or more processors, coupled to the memory, configured to:
determine a timing reference configuration that indicates an alignment for one or more symbol boundaries associated with forwarding communications between an upstream wireless node and a downstream wireless node; and
transmit information indicating the timing reference configuration to a wireless forwarding node configured to forward the communications between the upstream wireless node and the downstream wireless node based at least in part on the timing reference configuration.

* * * * *